US009207605B2

(12) United States Patent
Maeda

(10) Patent No.: US 9,207,605 B2
(45) Date of Patent: Dec. 8, 2015

(54) IMAGE FORMING APPARATUS, IMAGE FORMING SYSTEM, APPLICATION INSTALLATION METHOD, AND NON-TRANSITORY COMPUTER-READABLE RECORDING MEDIUM ENCODED WITH APPLICATION INSTALLATION PROGRAM

(71) Applicant: Konica Minolta, Inc., Chiyoda-ku (JP)

(72) Inventor: Toshihiro Maeda, Sakai (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 95 days.

(21) Appl. No.: 13/972,453

(22) Filed: Aug. 21, 2013

(65) Prior Publication Data
US 2014/0056607 A1 Feb. 27, 2014

(30) Foreign Application Priority Data
Aug. 23, 2012 (JP) ................................. 2012-183908

(51) Int. Cl.
G06F 9/445 (2006.01)
G06F 9/44 (2006.01)
(Continued)

(52) U.S. Cl.
CPC ............ G03G 15/50 (2013.01); G06K 15/1805 (2013.01); G06K 15/1809 (2013.01); G06K 15/005 (2013.01)

(58) Field of Classification Search
USPC ................................................. 717/168–178
See application file for complete search history.

(56) References Cited

U.S. PATENT DOCUMENTS 8,330,992 B2 * 12/2012 Kuroda ........................ 358/1.13
8,873,077 B2 * 10/2014 Tomono et al. .............. 358/1.13
(Continued)

FOREIGN PATENT DOCUMENTS

JP 2008-021251 A 1/2008
JP 2010-079348 A 4/2010
(Continued)

OTHER PUBLICATIONS

Office Action (Notice of Ground Rejection) issued on Dec. 2, 2014, by the Japan Patent Office in corresponding Japanese Patent Application No. 2012-183908, and an English Translation of the Office Action. (7 pages).

Primary Examiner — Don Wong
Assistant Examiner — Marina Lee
(74) Attorney, Agent, or Firm — Buchanan Ingersoll & Rooney PC

(57) ABSTRACT

An image forming apparatus includes an internal control portion operable, in response to input of an internal command, to perform processing predetermined for the internal command in accordance with a parameter set for a setting item corresponding to the internal command, an application executing portion to execute an application program, and an application control portion operable, in the case where the application executing portion outputs an application command, to convert the application command into an internal command and output the internal command to the internal control portion. The application control portion includes an analysis portion operable, at the stage of installation of an application program, to analyze the application program and extract an application command, and a setting information updating portion to update the setting information to a state where the internal control portion is capable of executing the internal command corresponding to the application command.

21 Claims, 15 Drawing Sheets

(51) Int. Cl.
  *G03G 15/00*   (2006.01)
  *G06K 15/02*   (2006.01)
  *G06K 15/00*   (2006.01)

(56) References Cited

U.S. PATENT DOCUMENTS

| | | | |
|---|---|---|---|
| 2004/0109187 A1* | 6/2004 | Matsushima | 358/1.13 |
| 2004/0218208 A1* | 11/2004 | Akiyoshi et al. | 358/1.15 |
| 2005/0046887 A1* | 3/2005 | Shibata et al. | 358/1.13 |
| 2005/0108705 A1* | 5/2005 | Koyama | 717/174 |
| 2006/0164670 A1* | 7/2006 | Morita | 358/1.13 |
| 2007/0283295 A1* | 12/2007 | Honma | 715/847 |
| 2008/0007775 A1* | 1/2008 | Mizobuchi et al. | 358/1.15 |
| 2010/0027040 A1* | 2/2010 | Kuroda | 358/1.9 |
| 2011/0239123 A1* | 9/2011 | Tsujimoto | 715/740 |
| 2011/0249291 A1* | 10/2011 | Tsuzuki et al. | 358/1.15 |
| 2011/0292428 A1* | 12/2011 | Ishii | 358/1.13 |
| 2012/0030322 A1* | 2/2012 | Kataoka et al. | 709/221 |
| 2012/0096452 A1* | 4/2012 | Yamamuro | 717/174 |
| 2013/0201511 A1* | 8/2013 | Teramoto et al. | 358/1.13 |
| 2014/0022578 A1* | 1/2014 | Takahashi et al. | 358/1.13 |
| 2014/0055801 A1* | 2/2014 | Tomono et al. | 358/1.9 |
| 2014/0056607 A1* | 2/2014 | Maeda | 399/75 |

FOREIGN PATENT DOCUMENTS

| | | |
|---|---|---|
| JP | 2011-229183 A | 11/2011 |
| JP | 2012-156758 A | 8/2012 |

* cited by examiner

F I G. 2
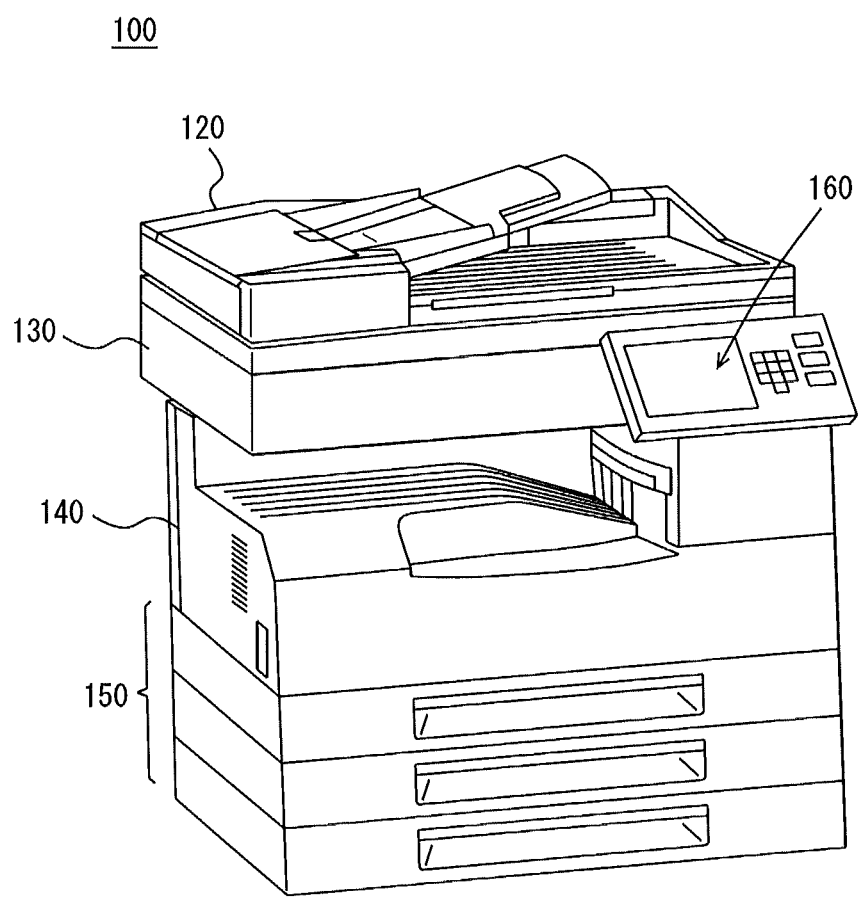

F I G. 5
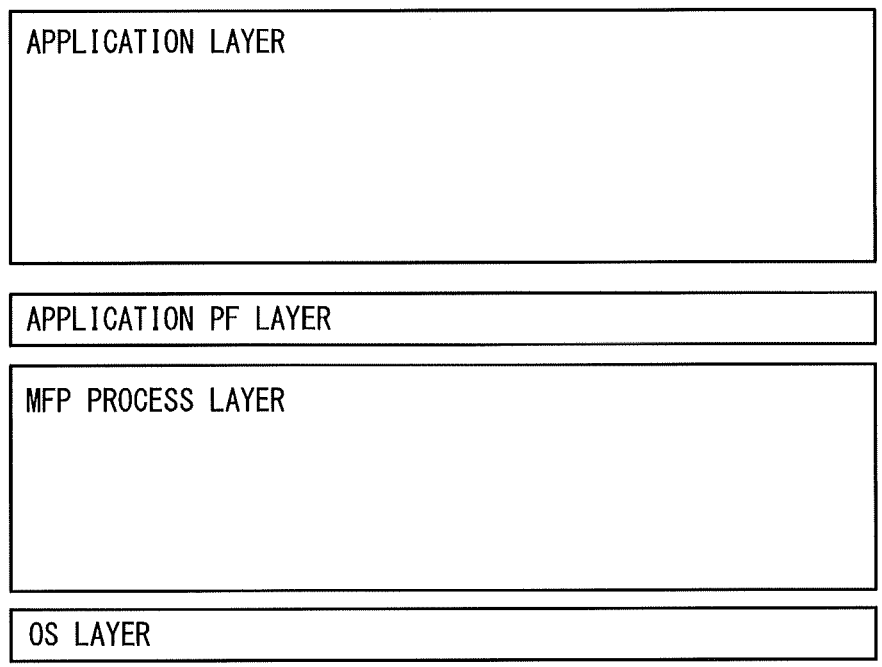

| APPLICATION COMMAND | SETTING ITEM | PARAMETER |
|---|---|---|
| iws_auth_login() | KIOSK MODE | On |
| | AUTHENTICATION MODE | INTERMEDIATE AUTHENTICATION |
| | AUTHENTICATION TYPE | USER-SPECIFIED |
| | IWS | On |
| | SSL | On |
| iws_scan_startjob() | IWS | On |
| | SSL | On |
| iws_copy_startjob() | IWS | On |
| | SSL | On |
| iws_copy_default() | Copy SETTING | USER-SPECIFIED |

| SCREEN NAME | SCREEN TYPE | PARAMETER | SETTING COMMAND |
|---|---|---|---|
| AUTHENTICATION TYPE SELECTION | Selection | USER AUTHENTICATION<br>DEPARTMENT AUTHENTICATION<br>USER AUTHENTICATION +<br>DEPARTMENT AUTHENTICATION | mfp_auth() |

IMAGE FORMING APPARATUS, IMAGE FORMING SYSTEM, APPLICATION INSTALLATION METHOD, AND NON-TRANSITORY COMPUTER-READABLE RECORDING MEDIUM ENCODED WITH APPLICATION INSTALLATION PROGRAM

This application is based on Japanese Patent Application No. 2012-183908 filed with Japan Patent Office on Aug. 23, 2012, the entire content of which is hereby incorporated by reference.

BACKGROUND OF THE INVENTION

1. Field of the Invention

The present invention relates to an image forming apparatus, an image forming system, an application installation method, and a non-transitory computer-readable recording medium encoded with an application installation program. More particularly, the present invention relates to an image forming apparatus into which an application program can be installed, an image forming system including the image forming apparatus, an application installation method performed by the image forming apparatus, and a non-transitory computer-readable recording medium encoded with an application installation program for causing a computer to perform the application installation method.

2. Description of the Related Art

Some recent image forming apparatuses, typified by multi-function peripherals (MFPs), allow application programs to be installed therein. A user can customize an MFP by installing therein an application program according to the type of usage.

Japanese Patent Laid-Open No. 2011-229183 describes an MFP which includes a Web application for allowing a customization program of control means or an application to be input through a Web page from a client terminal connected to the Internet.

Although the conventional MFP can facilitate installation of a customization program, an MFP has various settings made for performing processes, and these settings may have to be changed so as to be suitable for the customization program installed. Generally, a user uses an operation panel of the MFP to change the settings.

SUMMARY OF THE INVENTION

The present invention has been made to solve the foregoing problems, and an object of the present invention is to provide an image forming apparatus which can readily be set to a state where it is capable of executing an application program Another object of the present invention is to provide an image forming system in which, at the time of installing an application program from an information processing apparatus to an image forming apparatus, it is readily possible to set the image forming apparatus to the state where it is capable of executing the application program.

A further object of the present invention is to provide an application installation method which facilitates setting of an image forming apparatus at the time of installation of an application program.

Yet another object of the present invention is to provide a non-transitory computer-readable recording medium encoded with an application installation program which facilitates setting of an image forming apparatus at the time of installation of an application program.

In order to accomplish the above-described objects, an aspect of the present invention provides an image forming apparatus which includes: an internal control portion operable, in response to input of an internal command, to refer to setting information having parameters set respectively for a plurality of setting items, and perform processing predetermined for the input internal command in accordance with the parameter set for the setting item corresponding to the input internal command; an application executing portion to execute an application program; and an application control portion operable, in the case where the application executing portion executes the application program and outputs an application command which has been released for controlling the internal control portion, to convert the output application command into the internal command and output the obtained internal command to the internal control portion, wherein the application control portion includes an analysis portion operable, at the stage of installation of the application program, to analyze the application program and extract the application command, and a setting information updating portion to update the setting information to a state where the internal control portion is capable of executing the internal command corresponding to the extracted application command.

Another aspect of the present invention provides an image forming system including an image forming apparatus and an information processing apparatus capable of communicating with the image forming apparatus, wherein the image forming apparatus includes: an internal control portion operable, in response to input of an internal command, to refer to setting information having parameters set respectively for a plurality of setting items, and perform processing predetermined for the input internal command in accordance with the parameter set for the setting item corresponding to the input internal command; a parameter setting portion operable, in response to input of a setting command, to set a parameter for the setting item specified by the setting command; an application executing portion to execute an application program; an application control portion operable, in the case where the application executing portion executes the application program and outputs an application command which has been released for controlling the internal control portion, to convert the output application command into the internal command and output the obtained internal command to the internal control portion; and a conversion table transmitting portion to transmit a conversion table in response to a request from the information processing apparatus, the conversion table associating each of the plurality of application commands with a setting item for which a parameter needs to be set in order for the internal control portion to execute the internal command corresponding to the application command; wherein the information processing apparatus includes: a conversion table acquisition portion to acquire the conversion table from the image forming apparatus; an installation instruction portion to transmit, to the image forming apparatus, an instruction to install an application program into said image forming apparatus; an application analysis portion to analyze the application program and extract the application command; and a setting information remote updating portion to transmit, to the image forming apparatus, a setting command instructing to set a parameter for the setting item associated with the extracted application command by the conversion table; and wherein the application control portion in the image forming apparatus includes an installation portion to install an application program in accordance with an installation instruction received from the information processing apparatus, and a setting information updating portion operable, in response to reception of the setting command from the information processing apparatus, to output the setting command to the parameter setting portion.

A further aspect of the present invention provides an application installation method performed by an image forming apparatus, the image forming apparatus including an internal control portion operable, in response to input of an internal command, to refer to setting information having parameters set respectively for a plurality of setting items, and perform processing predetermined for the input internal command in accordance with the parameter set for the setting item corresponding to the input internal command, and an application executing portion to execute an application program, wherein the method includes: an application control step of, in the case where the application executing portion executes the application program and outputs an application command which has been released for controlling the internal control portion, converting the output application command into the internal command and outputting the obtained internal command to the internal control portion; a step of, at the stage of installation of the application program, analyzing the application program and extracting the application command; and a setting information updating step of updating the setting information to a state where the internal control portion is capable of executing the internal command corresponding to the extracted application command.

Yet another aspect of the present invention provides a non-transitory computer-readable recording medium encoded with an application installation program performed by a computer controlling an image forming apparatus, the image forming apparatus including an internal control portion operable, in response to input of an internal command, to refer to setting information having parameters set respectively for a plurality of setting items, and perform processing predetermined for the input internal command in accordance with the parameter set for the setting item corresponding to the input internal command, and an application executing portion to execute an application program, wherein the program causes the computer to perform: an application control step of, in the case where the application executing portion executes the application program and outputs an application command which has been released for controlling the internal control portion, converting the output application command into the internal command and outputting the obtained internal command to the internal control portion; a step of, at the stage of installation of the application program, analyzing the application program and extracting the application command; and a setting information updating step of updating the setting information to a state where the internal control portion is capable of executing the internal command corresponding to the extracted application command.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is a perspective view showing an example of the appearance of an MFP;

FIG. 5 shows an example of the software architecture of a CPU included in the MFP;

DESCRIPTION OF THE PREFERRED EMBODIMENTS

Figure 1:
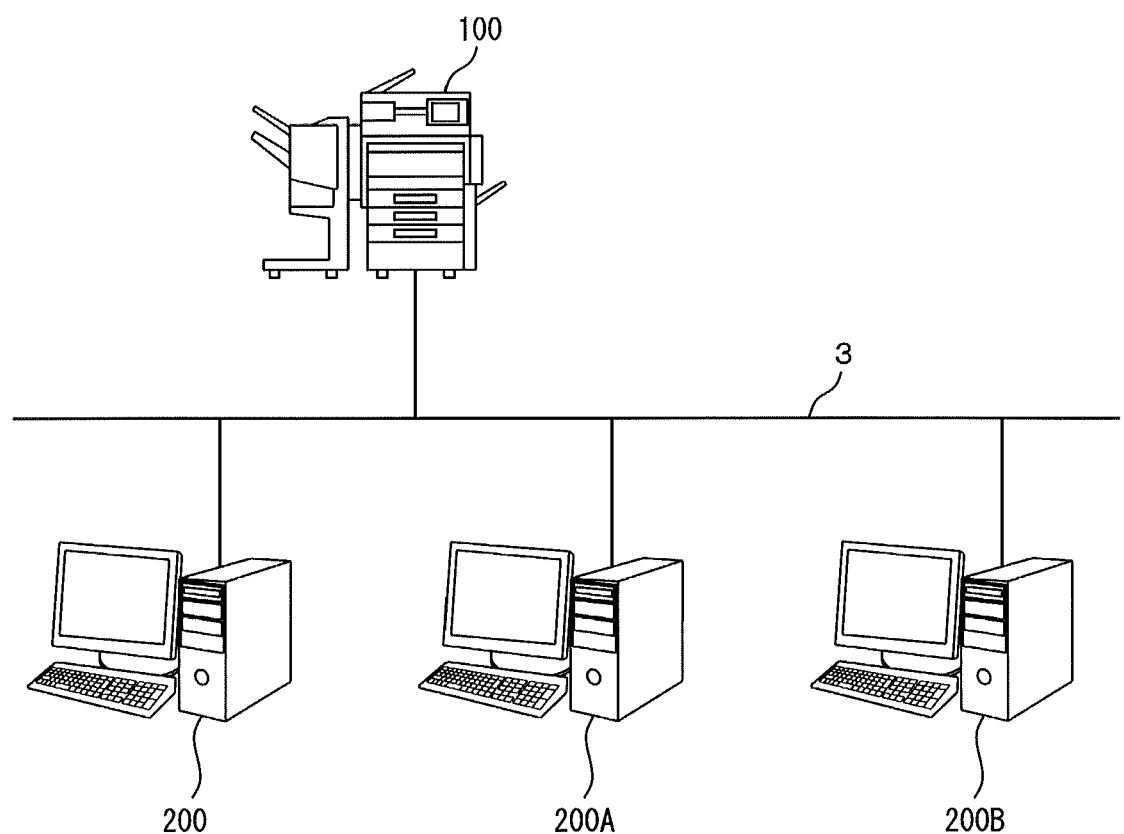
FIG. 1 schematically shows an image forming system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

<First Embodiment>

FIG. 1 schematically shows an image forming system according to an embodiment of the present invention. Referring to FIG. 1, an image forming system includes a multi-function peripheral (hereinafter, referred to as "MFP") 100 and personal computers (hereinafter, referred to as "PCs") 200, 200A, and 200B, which are each connected to a network 3. MFP 100 can communicate with PCs 200, 200A, and 200B via network 3.

While one MFP 100, as an example of an image forming apparatus, is connected to network 3 in FIG. 1, the number of the MFPs is not limited thereto; at least one MFP may be connected to network 3. Further, the image forming apparatus is not limited to the MFP; it may be, e.g., a computer, facsimile machine, printer, or other device, as long as it is provided with the image processing function.

Figure 3:
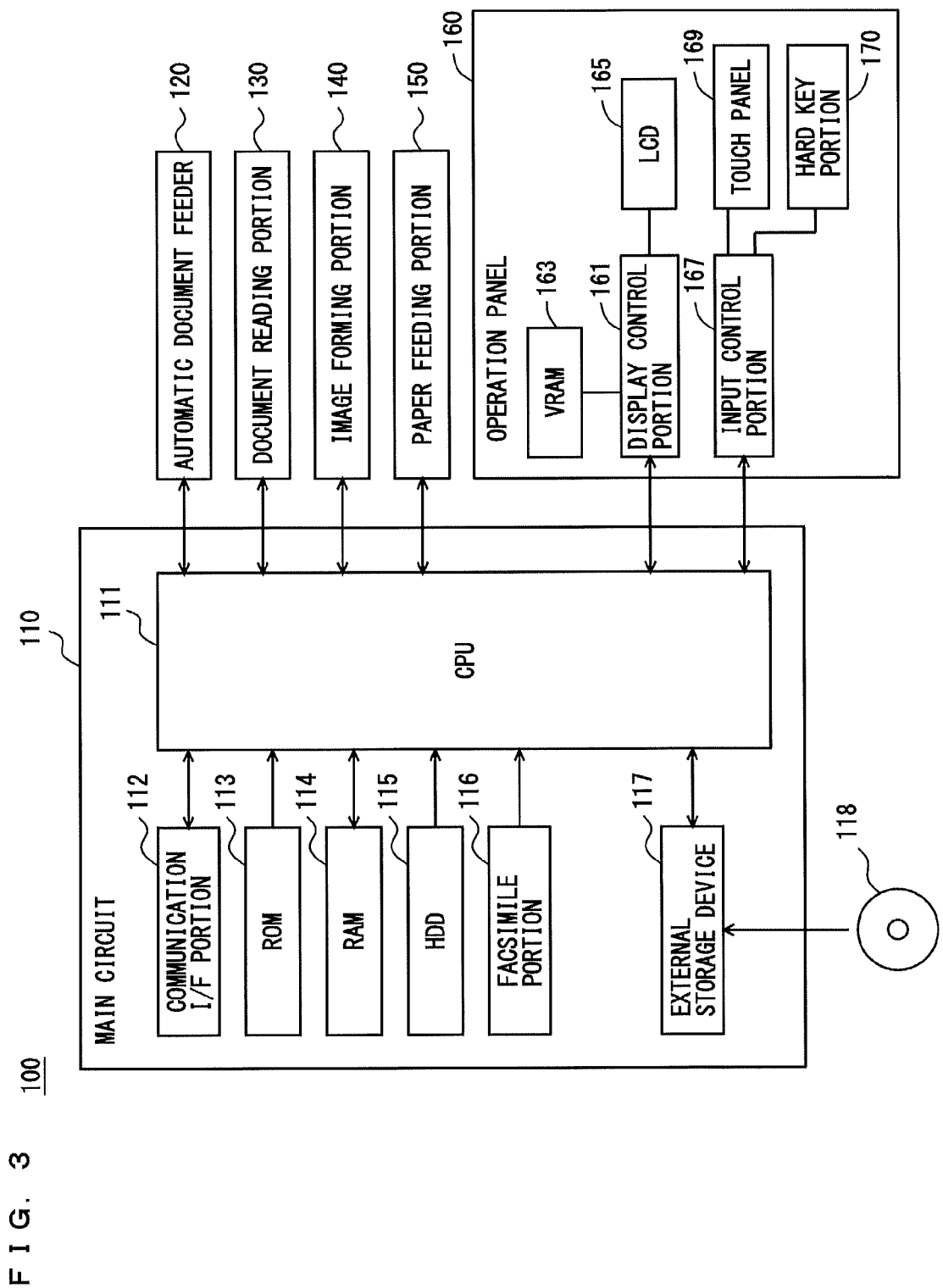
FIG. 3 is a block diagram showing an example of the hardware configuration of the MFP.

FIG. 2 is a perspective view showing an example of the appearance of the MFP. FIG. 3 is a block diagram showing an example of the hardware configuration of the MFP. Referring to FIGS. 2 and 3, MFP 100 serving as the image forming apparatus includes: a main circuit 110; a document reading portion 130 for reading a document; an automatic document feeder 120 for feeding a document to document reading portion 130; an image forming portion 140 for forming an image on a sheet of paper or the like on the basis of image data which is output from document reading portion 130 that has read a document; a paper feeding portion 150 for feeding a sheet of paper to image forming portion 140; and an operation panel 160 serving as a user interface.

Main circuit 110 includes: a central processing unit (CPU) 111; a communication interface (I/F) portion 112; a read only memory (ROM) 113; a random access memory (RAM) 114; a hard disk drive (HDD) 115 as a mass storage; a facsimile portion 116; and an external storage device 117. CPU 111 is connected with automatic document feeder 120, document reading portion 130, image forming portion 140, paper feeding portion 150, and operation panel 160, and is responsible for overall control of MFP 100.

Automatic document feeder 120 automatically feeds a plurality of documents set on a document feed tray, one by one, to a predetermined document reading position set on a platen glass of document reading portion 130, and outputs the document, the image of which has been read by document reading portion 130, onto a document output tray. Document reading portion 130 includes an optical source which irradiates a document placed on the document reading position with light and a photoelectric conversion element which receives light reflected from the document, and scans a document image having a size corresponding to that of the document. The photoelectric conversion element converts the received light into image data made up of electric signals, and outputs the image data to image forming portion 140. Paper feeding portion 150 feeds a sheet of paper, stored in a paper feed tray, to image forming portion 140.

Image forming portion 140 forms an image using well-known electrophotography. Image forming portion 140 performs various kinds of data processing such as shading compensation on image data received from document reading portion 130 and, on the basis of the processed image data, or on the basis of externally received image data, forms an image on a sheet of paper fed by paper feeding portion 150.

Facsimile portion 116 is connected to public switched telephone networks (PSTN), and transmits facsimile data to or receives facsimile data from the PSTN. Facsimile portion 116 stores the received facsimile data in HDD 115. Alternatively, facsimile portion 116 converts the data into print data which can be printed in image forming portion 140, and outputs the same to image forming portion 140, thereby causing image forming portion 140 to form an image on a sheet of paper on the basis of the facsimile data received by facsimile portion 116. Further, facsimile portion 116 converts the data stored in HDD 115 to facsimile data, and transmits the same to a facsimile machine connected to the PSTN.

Communication I/F portion 112 is an interface for connecting MFP 100 to a network. Communication I/F portion 112 communicates with another computer or image forming apparatus connected to the network, using a communication protocol such as the transmission control protocol (TCP) or the file transfer protocol (FTP). The network to which communication I/F portion 112 is connected is a local area network (LAN). It may be connected in a wired or wireless manner. The network is not necessarily the LAN; it may be a wide area network (WAN), public switched telephone networks (PSTN), the Internet, or the like.

ROM 113 stores a program to be executed by CPU 111 or data necessary for execution of the program. RAM 114 is used as a work area when CPU 111 executes a program. Further, RAM 114 temporarily stores read images continuously transmitted from document reading portion 130.

Operation panel 160 includes: a liquid crystal display (LCD) 165; a display control portion 161 which controls display on LCD 165; a video RAM (VRAM) 163; a touch panel 169; a hard key portion 170; and an input control portion 167 which controls touch panel 169 and hard key portion 170. LCD 165 and hard key portion 170 are arranged on an upper surface of MFP 100.

Display control portion 161 is connected to CPU 111, VRAM 163, and LCD 165. VRAM 163 is used as a work area of display control portion 161, and temporarily stores an image to be displayed on LCD 165. Display control portion 161, under the control of CPU 111, controls LCD 165 to cause LCD 165 to display the image stored in VRAM 163. Display control portion 161 causes LCD 165 to display an operation screen, which will be described later.

Hard key portion 170 includes a plurality of hard keys. The hard keys, which are contact switches, are connected to input control portion 167. Each hard key, when depressed by an operation user, closes its contact to close a circuit connected to input control portion 167. Each hard key closes the circuit while being depressed by an operation user who operates MFP 100, whereas it opens the circuit while not being depressed by the operation user.

Touch panel 169 is disposed on an upper or lower surface of LCD 165, and outputs the coordinates of a position pushed by the operation user to input control portion 167. Touch panel 169 detects the position designated by the operation user with his/her finger or a stylus pen, and outputs the coordinates of the detected position to input control portion 167. Touch panel 169 preferably has a size equal to or greater than that of the display surface of LCD 165. As touch panel 169 is disposed on the surface of LCD 165, when the operation user designates a position on the display surface of LCD 165, touch panel 169 outputs the coordinates of the position that the operation user has designated on the display surface of LCD 165, to input control portion 167. The touch panel may be, for example, of a resistive type, a surface acoustic wave type, an infrared ray type, an electromagnetic induction type, or a capacitance type, although it is not limited to these types.

If there is any hard key that closed the circuit in hard key portion 170, input control portion 167 outputs identification information for identifying the hard key that closed the circuit, to CPU 111. When touch panel 169 detects a position designated by the operation user, input control portion 167 outputs the coordinates that are output from touch panel 169, as position information indicating the position on the display surface of LCD 165, to CPU 111.

External storage device 117, which is controlled by CPU 111, is mounted with a compact disc read-only memory (CD-ROM) 118. CPU 111 is capable of accessing CD-ROM 118 via external storage device 117. CPU 111 loads a program recorded on CD-ROM 118 mounted on external storage device 117, into RAM 114 for execution. It is noted that the program executed by CPU 111 is not restricted to the program recorded on CD-ROM 118. CPU 111 may load a program stored in HDD 115, into RAM 114 for execution. In this case, via the network to which communication I/F portion 112 is connected, another computer connected to the network may rewrite the program stored in HDD 115 of MFP 100, or additionally write a new program therein. Further, MFP 100 may download a program from another computer connected to the network, and store the program into HDD 115. As used herein, the "program" includes, not only the program which CPU 111 can execute directly, but also a source program, a compressed program, an encrypted program, and so on.

It is noted that the medium for storing a program executed by CPU 111 is not restricted to CD-ROM 118. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

Figure 4:
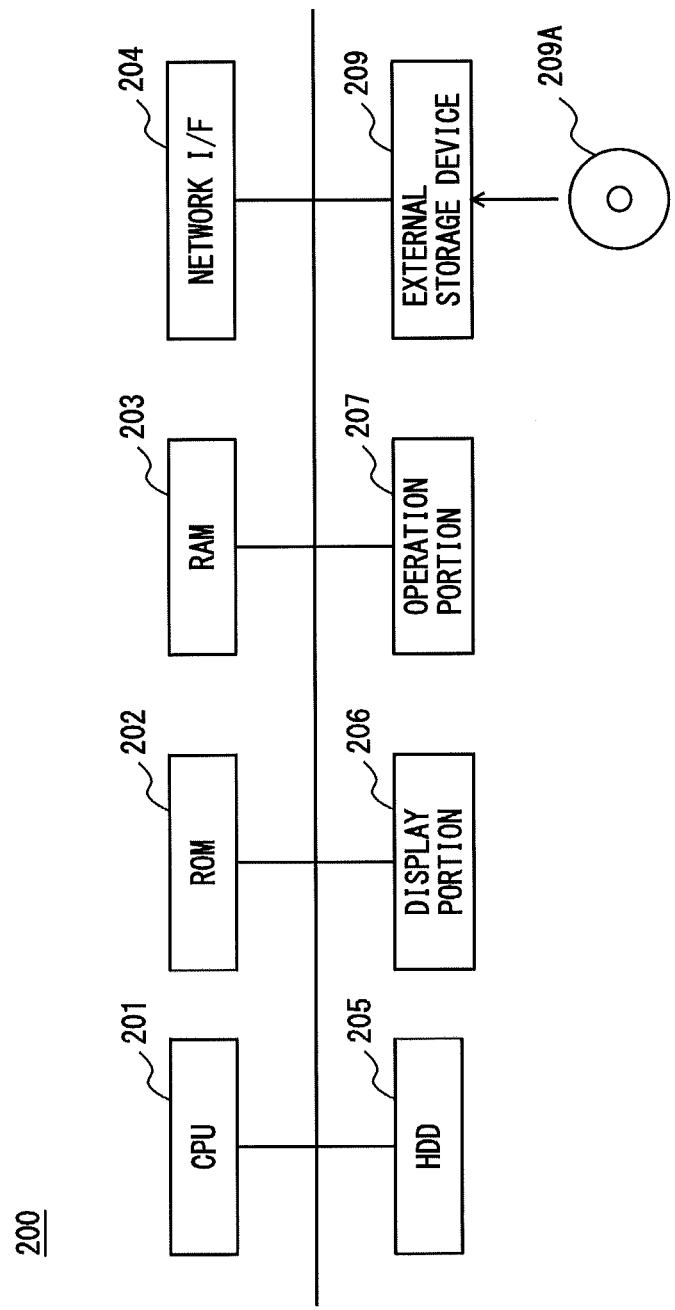
FIG. 4 is a block diagram showing an example of the hardware configuration of a PC.

The hardware configurations and functions of PCs 200, 200A, and 200B are the same. Hereinbelow, unless specifically stated, PC 200 will be described representatively. FIG. 4 is a block diagram showing an example of the hardware configuration of the PC. Referring to FIG. 4, PC 200 includes: a CPU 201 which is responsible for overall control of PC 200; a ROM 202 which stores a program executed by CPU 201 and others; a RAM 203 used as a work area for CPU 201; a network I/F 204 which connects PC 200 to network 3; a HDD 205 as a mass storage; a display portion 206 such as a liquid crystal display; an operation portion 207 for accepting an input of an operation by a user; and an external storage device 209.

External storage device 209 is mounted with a CD-ROM 209A which stores a program. CPU 201 loads the program stored in CD-ROM 209A, via external storage device 209, into RAM 203 for execution. It is noted that the recording medium for storing the program is not restricted to CD-ROM 209A. It may be a flexible disk, a cassette tape, an optical disk (MO, MD, DVD), an IC card, an optical card, or a semiconductor memory such as a mask ROM, an EPROM, an EEPROM, or the like. Further, the program stored in HDD 205 may be loaded into RAM 203 for execution. In this case, PC 200 may download a program from another computer connected to the Internet, and store the program into HDD 205.

FIG. 5 shows an example of the software architecture of the CPU included in the MFP. Referring to FIG. 5, in CPU 111, an operating system (OS) layer is formed as the bottom layer, and an MFP process layer is formed above the OS layer. Above the MFP process layer, an application platform (PF) layer is formed, and an application layer is formed above the application PF layer.

A task for CPU 111 to execute an OS program belongs to the OS layer. The task belonging to the OS layer performs processing of controlling the hardware resources in MFP 100. Here, the hardware resources include communication I/F portion 112, ROM 113, RAM 114, HDD 115, facsimile portion 116, external storage device 117, automatic document feeder 120, document reading portion 130, image forming portion 140, paper feeding portion 150, display control portion 161, and input control portion 167. The task belonging to the OS layer controls the hardware resources in accordance with an operating command input from the MFP process layer.

A task for CPU 111 to execute an application program belongs to the application layer. In the case where two or more application programs are installed into MFP 100, two or more tasks of executing the respective application programs may belong to the application layer. The application programs include programs for customizing a user interface and the like so as to cause MFP 100 to perform the copying process, scanning process, printing process, facsimile transmitting/receiving process, data transmitting/receiving process, and so on. It is noted that the application programs are not restricted to the above-described programs; there may be another application program. An application program is described, for example, in a programming language such as Python, although the language is not particularly limited.

The task of executing an application program performs a plurality of types of processes determined by the application program. The plurality of types of processes include a process of causing a task belonging to the MFP process layer to perform a process to be performed in the MFP process layer. In the case of causing the task belonging to the MFP process layer to perform a process, the task of executing the application program outputs an application command. The application command is a command which has been released as an application program interface (API). This facilitates creation of an application program for causing MFP 100 to perform a process. Releasing something means that a third party other than the manufacturer of MFP 100 can use it. The third party is able to use the application commands to develop an application program.

The application PF layer, located between the application layer and the MFP process layer, has belonging thereto a task of arbitrating a plurality of tasks belonging to the application layer and also controlling the application commands output from the plurality of tasks belonging to the application layer. More specifically, the application PF layer brings one of the tasks belonging to the application layer into a currently selected state in which data can be input/output. The application PF layer accepts an application command output from the one of the tasks belonging to the application layer that has been set in the currently selected state, converts the application command into an internal command, and outputs the internal command to the MFP process layer. Application commands are associated with internal commands in advance. For example, a commands correspondence table may be stored. One application command may correspond to one internal command, or one application command may correspond to a set of two or more internal commands. Further, two or more application commands of different versions may correspond to one internal command or to a set of two or more internal commands. This can address the case where two or more application programs are of different versions. The internal command is a command which has not been released and which depends upon the hardware resource(s) in MFP 100.

The MFP process layer, located between the application PF layer and the OS layer, has belonging thereto a task for CPU 111 to execute an MFP control program. The MFP process layer has belonging thereto a task of converting an internal command, output from a task belonging to the application PF layer, into an operating command which can be interpreted by a task belonging to the OS layer, and outputting the operating command to the task belonging to the OS layer. While an internal command may be actually converted into one or more operating commands which can be executed by a task belonging to the OS layer, for the convenience sake, it is here assumed that one internal command is converted into one operating command executable by the task belonging to the OS layer.

Figure 6:
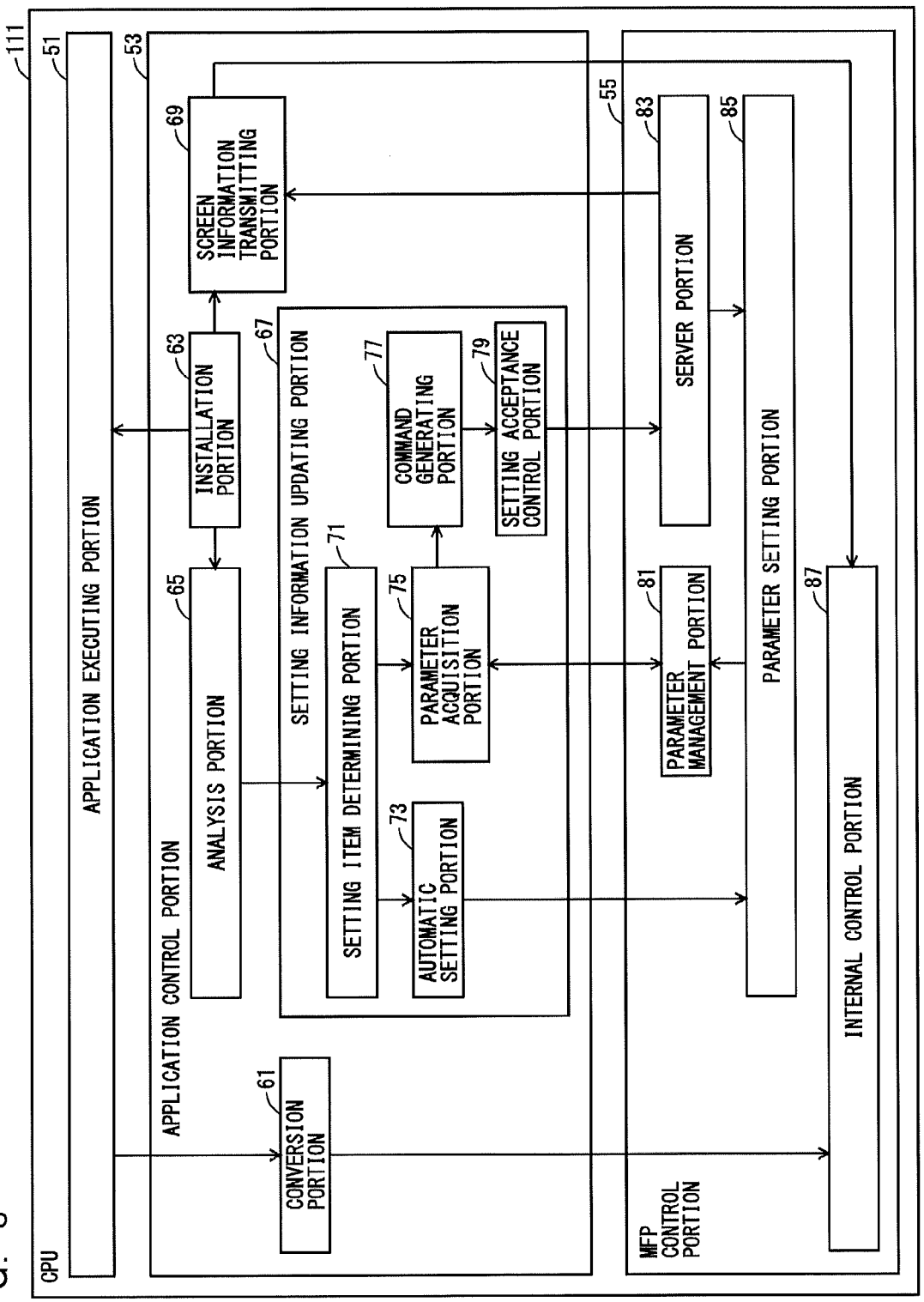
FIG. 6 is a block diagram showing, by way of example, the functions of the CPU included in the MFP according to a first embodiment of the present invention.

FIG. 6 is a block diagram showing, by way of example, the functions of the CPU included in the MFP according to the first embodiment of the present invention. The functions shown in FIG. 6 are implemented by CPU 111 included in MFP 100 as CPU 111 executes programs stored in ROM 113, HDD 115, or CD-ROM 118. Specifically, the functions are implemented by CPU 111 as CPU 111 executes an OS program, an MFP control program, an application control program, and an application program.

Referring to FIG. 6, CPU 111 includes an application executing portion 51, an application control portion 53, and an MFP control portion 55. Application executing portion 51 belongs to the application layer in the software architecture shown in FIG. 5. Application executing portion 51 is a function implemented by a task for CPU 111 to execute an application program. Application executing portion 51 outputs an application command determined by an application program to application control portion 53. Application executing portion 51 is capable of executing a plurality of application programs. In this case, application executing portion 51 executes a plurality of application programs to form a plurality of tasks corresponding to the respective application programs. The task formed by executing an application program outputs an application command to application control portion 53.

Application control portion 53 is a function implemented by a task for CPU 111 to execute the application control program. Application control portion 53 belongs to the application PF layer in the software architecture shown in FIG. 5.

Application control portion 53 includes a conversion portion 61, an installation portion 63, an analysis portion 65, a setting information updating portion 67, and a screen information transmitting portion 69. Conversion portion 61 receives an application command which is output from the task formed in application executing portion 51, and converts the input application command into an internal command in accordance with a commands correspondence table. Conversion portion 61 outputs the obtained internal command to MFP control portion 55.

The commands correspondence table associates one application command with one or more internal commands. The application commands included in the commands correspondence table may include the application commands of the same type but of different versions. In such a case, each of the application commands of different versions is associated with one or more internal commands. This enables installation of application programs having application commands of different versions described therein. When a new application command appears, the commands correspondence table is updated with a commands correspondence table in which the new application command is associated with one or more internal commands. This enables installation of an application program having the new application command described therein.

Further, in the case where application executing portion 51 is formed with a plurality of tasks of executing application programs, conversion portion 61 arbitrates the plurality of tasks. Specifically, in the case where application executing portion 51 has a plurality of tasks of executing application programs formed therein, conversion portion 61 brings one of the tasks into a currently selected state in which data can be input/output. Hereinafter, the one of the tasks, formed in application executing portion 51, that has been brought into the currently selected state by conversion portion 61 will be referred to as "current task".

MFP control portion 55 is a function implemented by a task for CPU 111 to execute the MFP control program. MFP control portion 55 belongs to the MFP process layer in the software architecture shown in FIG. 5. MFP control portion 55 includes a parameter management portion 81, a server portion 83, a parameter setting portion 85, and an internal control portion 87. Internal control portion 87 receives an internal command from conversion portion 61 in application control portion 53, and performs processing determined by the internal command, in accordance with predetermined setting information. The setting information is managed by parameter management portion 81 and stored in HDD 115.

Parameter management portion 81 manages the setting information stored in HDD 115. The setting information is information used for internal control portion 87 to perform processing, and it includes a plurality of setting items for each of which a parameter is set. The setting items are predetermined for the processing executed by internal control portion 87. Each parameter, which has an attribute determined for a setting item, includes a numerical value or a logical value indicating whether to allow execution of the processing. Further, the setting information includes setting records which each define one or more parameters which can be set for a setting item. While one of a plurality of parameters is set for a setting item, the setting information defines the range of parameter(s) that can be set for the setting item. The setting information further includes a forbidden condition. The forbidden condition defines a set of parameters that cannot be set for two or more setting items simultaneously.

When internal control portion 87 receives an internal command, internal control portion 87 refers to the setting information to acquire a parameter that has been set for the setting item corresponding to the internal command, and performs the processing determined by the internal command, in accordance with the parameter acquired for the setting item. Specifically, internal control portion 87 extracts, from among a plurality of setting records included in the setting information, a setting record that includes a setting item corresponding to the internal command, and acquires a parameter that has been associated with the setting item by the extracted setting record. The processing determined by an internal command includes processing for controlling the hardware resource(s) included in MFP 100, and data processing. The hardware resources included in MFP 100 include HDD 115, facsimile portion 116, communication I/F portion 112, external storage device 117, automatic document feeder 120, document reading portion 130, image forming portion 140, and paper feeding portion 150. The data processing is not particularly limited, but may be sharpening, synthesis, enlargement, reduction, or other processing performed on image data.

In the case of performing the processing for controlling the hardware resource(s) included in MFP 100, internal control portion 87 converts the internal command into an operating command, and outputs the operating command to a task for CPU 111 to execute the operating program. The operating command is a command which can be interpreted by the task for CPU 111 to execute the operating program. The task for CPU 111 to execute the operating program belongs to the OS layer in the software architecture shown in FIG. 5.

The function of installing an application program will now be described. Installation portion 63 installs an application program into MFP 100 in accordance with an installation instruction input by a user. An installation instruction may be received from one of PCs 200, 200A, and 200B by communication I/F portion 112, or may be input into operation panel 160. When a user operates operation panel 160 to input an installation instruction, installation portion 63 accepts the installation instruction from input control portion 167. When a user operates one of PCs 200, 200A, and 200B to remotely control MFP 100 to input an installation instruction, installation portion 63 accepts the installation instruction that communication I/F portion 112 receives from the one of PCs 200, 200A, and 200B. In the case where an installation instruction is received by communication I/F portion 112, installation portion 63 outputs device identification information for identifying the one of PCs 200, 200A, and 200B that has issued the installation instruction, to screen information transmitting portion 69. The device identification information only needs to be able to identify the device. For example, a network address assigned to the device in network 3 can be used as the device identification information.

Installation portion 63 acquires the application program designated by the user. In the case where a user who wishes to cause MFP 100 to read an application program mounts CD-ROM 118 storing the application program on external storage device 117, installation portion 63 reads and acquires the application program stored in CD-ROM 118 via external storage device 117. In the case where a user inputs into MFP 100 an instruction to download an application program stored in a computer connected to network 3, installation portion 63 downloads and acquires the application program via communication I/F portion 112. Installation portion 63 stores the acquired application program into HDD 115, and also outputs the application program to analysis portion 65. Application executing portion 51 described above reads the application program stored in HDD 115 by installation portion 63, into RAM 114 for execution.

Analysis portion 65 analyzes the application program input from installation portion 63, to extract an application command described in the application program. Analysis portion 65 outputs the extracted application command to setting information updating portion 67.

Setting information updating portion 67 includes a setting item determining portion 71, an automatic setting portion 73, a parameter acquisition portion 75, a command generating portion 77, and a setting acceptance control portion 79. When setting item determining portion 71 receives an application command from analysis portion 65, setting item determining portion 71 determines a setting item corresponding to the application command, by referring to a conversion table stored in HDD 115.

Figures 7, 8:
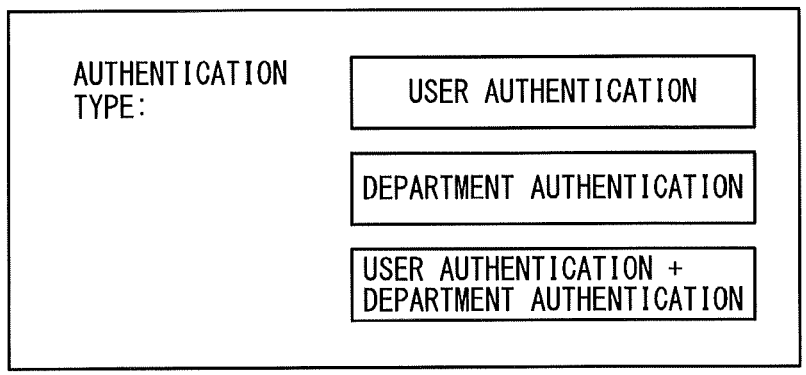
FIG. 7 shows an example of a conversion table.
FIG. 8 shows an example of a panel setting screen.

FIG. 7 shows an example of a conversion table. Referring to FIG. 7, the conversion table includes conversion records in each of which an application command is associated with a setting item for which a parameter needs to be set so as to allow internal control portion 87 to execute an internal command corresponding to the application command. Each conversion record includes an "application command" field, a "setting item" field, and a "parameter" field. In the "application command" field, an application command is set. In the "setting item" field, a setting item for which a parameter needs to be set so as to allow internal control portion 87 to execute an internal command that corresponds to the application command set in the "application command" field is set. For example, the conversion table includes five conversion records for the application command "iws_auth_login( )". These five conversion records each determine a setting item for which a parameter needs to be set in order for internal control portion 87 to execute an internal command corresponding to the application command "iws_auth_login( )". The setting items are: "KIOSK mode" determined in the first conversion record, "authentication mode" determined in the second conversion record, "authentication type" determined in the third conversion record, "IWS" determined in the fourth conversion record, and "SSL" determined in the fifth conversion record.

In the "parameter" field, if a single parameter that needs to be set for the setting item set in the "setting item" field so as to allow internal control portion 87 to execute the internal command corresponding to the application command set in the "application command" field can be determined, that parameter is set. If a single parameter cannot be determined, "user-specified" is set in the "parameter" field.

In the five conversion records corresponding to the application command "iws_auth_login( )", a parameter "On" is determined for the setting item "KIOSK mode" in the first conversion record, a parameter "intermediate authentication" is determined for the setting item "authentication mode" in the second conversion record, a parameter "On" is determined for the setting item "IWS" in the fourth conversion record, and a parameter "On" is determined for the setting item "SSL" in the fifth conversion record. That is, a single parameter has been determined for each of those setting items. On the other hand, in the third conversion record, "user-specified" is determined for the setting item "authentication type", meaning that a single parameter has not been determined for that setting item.

Returning to FIG. 6, in response to input of the application command from analysis portion 65, setting item determining portion 71 refers to the conversion table to extract a conversion record in which the application command input from analysis portion 65 is set in the "application command" field, and then determines a setting item which has been set in the "setting item" field in the extracted conversion record. Then, in the case where the extracted conversion record associates a single parameter with the setting item, setting item determining portion 71 outputs the conversion record to automatic setting portion 73. On the other hand, in the case where the extracted conversion record does not associate a single parameter with the setting item, setting item determining portion 71 outputs the conversion record to parameter acquisition portion 75.

For example, in the case where the application command "iws_auth_login( )" is received from analysis portion 65, setting item determining portion 71 extracts, from the conversion table shown in FIG. 7, the five conversion records having the application command "iws_auth_login( )" set in the "application command" field. Further, setting item determining portion 71 outputs the first conversion record to automatic setting portion 73 as it determines a single parameter "On" for the setting item "KIOSK mode", outputs the second conversion record to automatic setting portion 73 as it determines a single parameter "intermediate authentication" for the setting item "authentication mode", outputs the fourth conversion record to automatic setting portion 73 as it determines a single parameter "On" for the setting item "IWS", and outputs the fifth conversion record to automatic setting portion 73 as it determines a single parameter "On" for the setting item "SSL". On the other hand, setting item determining portion 71 outputs the third conversion record to parameter acquisition portion 75, as it determines, not a single parameter, but "user-specified" for the setting item "authentication type".

When automatic setting portion 73 receives a conversion record from setting item determining portion 71, automatic setting portion 73 generates a setting command for setting, for the setting item included in the conversion record, the parameter that is associated with the setting item by the conversion record, and outputs the setting command to MFP control portion 55. For example, on receipt of the conversion record having "iws_auth_login( )" set in the "application command" field, "KIOSK mode" set in the "setting item" field, and "On" set in the "parameter" field, automatic setting portion 73 generates a setting command which instructs to set the parameter "On" for the setting item "KIOSK mode".

When parameter acquisition portion 75 receives a conversion record from setting item determining portion 71, parameter acquisition portion 75 acquires one or more parameters. Parameter management portion 81 is configured to refer to setting information and display a panel setting screen corresponding to a setting item so as to allow a user to set a parameter for the setting item using operation panel 160, and update the setting information in accordance with a user operation input into operation panel 160. Parameter acquisition portion 75 acquires panel screen information that parameter management portion 81 uses when displaying the panel setting screen, and, on the basis of the acquired panel screen information, acquires one or more parameters that can be set for the setting item being set in the "setting item" field in the conversion record.

FIG. 8 shows an example of a panel setting screen. The panel setting screen shown in FIG. 8 is the screen displayed by parameter management portion 81 for the setting item "authentication type". On this screen, one of the three parameters of "user authentication", "department authentication", and "user authentication+department authentication" can be selected for the setting item "authentication type".

Figures 9, 10:
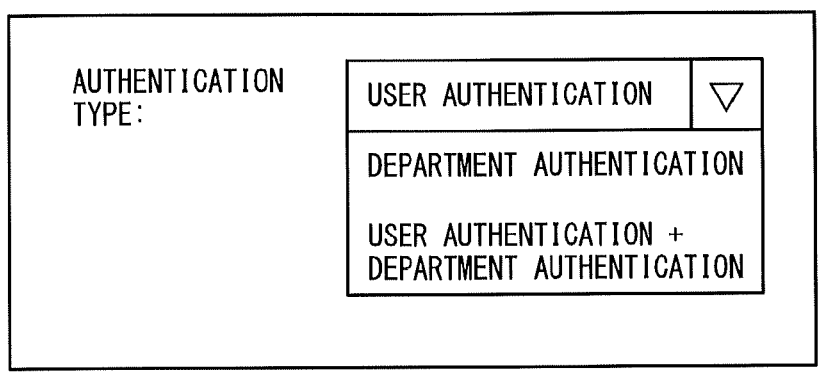
FIG. 9 shows an example of panel screen information.
FIG. 10 shows an example of a selection page.

FIG. 9 shows an example of panel screen information. The panel screen information shown in FIG. 9 is the information that parameter management portion 81 generates when displaying the panel setting screen shown in FIG. 8. Referring to FIG. 9, the panel screen information includes a "screen name" field, a "screen type" field, a "parameter" field, and a "setting command" field. In the "screen name" field, a name assigned to the panel setting screen is set. In the "screen type" field, a setting method by a user is set. The setting methods include, for example, a setting method in which a user selects one from among a plurality of candidates, and a setting method in which a user inputs a parameter directly. In this example, "Selection" is set in the "screen type" field. This means that the setting method in which a user selects one from among a plurality of candidates has been set. In the "parameter" field, one or more parameters which can be set for the setting item are set. In this example, the three parameters of "user authentication", "department authentication", and "user authentication+department authentication" which can be set for the setting item "authentication type" are set. In the "setting command" field, a setting command that is output when a user sets a parameter is set.

Returning to FIG. 6, in the case where a conversion record having "authentication type" set in the "setting item" field is received from setting item determining portion 71, parameter acquisition portion 75 acquires the panel screen information that parameter management portion 81 generates when displaying the panel setting screen corresponding to the setting item "authentication type". Then, parameter acquisition portion 75 extracts the parameters set in the acquired panel screen information, to thereby acquire the three parameters of "user authentication", "department authentication", and "user authentication+department authentication" as the parameters that can be set for the setting item "authentication type". As described above, parameter management portion 81 displays the panel setting screen and generates the panel screen information, on the basis of the setting information stored in HDD 115. Therefore, the one or more parameters being selectably displayed on the panel setting screen do not include the parameter(s) the setting of which is prohibited in accordance with the forbidden condition. That is, the one or more parameters being set in the "parameter" field in the panel screen information do not include any parameters that cannot be set because of the forbidden condition. Accordingly, parameter acquisition portion 75 is able to acquire only the parameter(s) that can be set for the setting item "authentication type" that is set in the "setting item" field in the conversion record.

Parameter acquisition portion 75 outputs a set of a setting item, one or more parameters which can be set for the setting item, and a setting command which is set in the "setting command" field in the panel screen information, to command generating portion 77. In this example, parameter acquisition portion 75 outputs a set of the setting item "authentication type", the three parameters of "user authentication", "department authentication", and "user authentication+department authentication", and the setting command "mfp_auth( )".

When command generating portion 77 receives a set of a setting item, one or more parameters which can be set for the setting item, and a setting command from parameter acquisition portion 75, command generating portion 77 generates an accept command and an output command. The accept command is a command instructing to accept selection of one of the one or more parameters received from parameter acquisition portion 75. The output command is a command instructing to output a setting command in which the parameter selected by a user as the accept command has been executed, is set as an argument. Command generating portion 77 outputs the accept command and the output command to setting acceptance control portion 79.

When setting acceptance control portion 79 receives an accept command and an output command from command generating portion 77, setting acceptance control portion 79 outputs a screen generation request command requesting generation of a selection page including the accept command and the output command, to server portion 83 in MFP control portion 55.

In response to reception of a screen generation request command from setting acceptance control portion 79, server portion 83 generates a selection page, and stores the page into HDD 115. Further, server portion 83 outputs a URL which is a network address of the selection page stored in HDD 115, to screen information transmitting portion 69.

FIG. 10 shows an example of a selection page. Referring to FIG. 10, the selection page is described in hypertext markup language (HTML). The selection page includes an area displaying the setting item "authentication type", and an area selectably displaying the three parameters of "user authentication", "department authentication", and "user authentication+department authentication". Shown here is the state where the parameter "user authentication" has been selected.

Returning to FIG. 6, screen information transmitting portion 69 receives device identification information for identifying the device that issued an installation instruction from installation portion 63, and receives a URL of a selection page from server portion 83. In the case where screen information transmitting portion 69 receives a URL of a selection page after it has received from installation portion 63 the device identification information of the device that issued the installation instruction, screen information transmitting portion 69 generates an internal command instructing to transmit the URL to the device specified by the device identification information, and outputs the generated internal command to internal control portion 87. When internal control portion 87 receives the internal command from screen information transmitting portion 69, internal control portion 87 transmits the URL included in the internal command, via communication I/F portion 112, to the device specified by the device identification information included in the internal command. When the device that issued the installation instruction receives the URL of the selection page, the device executes a browsing program and transmits a command, such as a GET command, for requesting transmission of the selection page specified by the URL, to MFP 100. In this case, when communication I/F portion 112 receives the GET command, server portion 83 acquires the GET command, and returns the selection page specified by the URL, via communication I/F portion 112. The selection page includes an accept command instructing to accept selection of a parameter, and an output command instructing to output a setting command for causing the parameter selected by a user as the accept command has been executed, to be set for the setting item. Therefore, when the accept command and the output command are executed in the device that issued the installation instruction, a setting command for causing the parameter selected by the user from among the one or more parameters acquired by parameter acquisition portion 75 to be set for the setting item, is transmitted to MFP 100. When communication I/F portion 112 receives the setting command, server portion 83 acquires the setting command, and outputs the setting command to parameter setting portion 85.

On the other hand, in the case where screen information transmitting portion 69 receives a URL of a selection page from server portion 83 while the device identification information of the device that issued an installation instruction is not received from installation portion 63, screen information transmitting portion 69 causes application executing portion 51 to execute a browsing program, and then passes the URL to the task of executing the browsing program, formed in application executing portion 51, to cause it to display the selection page. The task executed in application executing portion 51 outputs a command, such as a GET command, for requesting transmission of the selection page specified by the URL, to server portion 83. When server portion 83 receives the GET command from application executing portion 51, server portion 83 outputs the selection page specified by the URL, to application executing portion 51. The selection page includes an accept command instructing to accept selection of a parameter, and an output command instructing to output a setting command which causes the parameter selected by a user as the accept command has been executed, to be set for the setting item.

When application executing portion 51 receives a selection page from server portion 83, application executing portion 51 displays the selection page on LCD 165. When a user inputs into touch panel 169 or hard key portion 170 an operation of selecting a parameter, application executing portion 51 executes the accept command and the output command. Application executing portion 51 outputs a setting command for causing the parameter selected by the user from among the one or more parameters acquired by parameter acquisition portion 75 to be set for the setting item, to server portion 83. When server portion 83 receives the setting command from application executing portion 51, server portion 83 outputs the setting command to parameter setting portion 85.

When parameter setting portion 85 receives a setting command from automatic setting portion 73 or server portion 83, parameter setting portion 85 executes the setting command to update the setting information stored in HDD 115. Specifically, parameter setting portion 85 associates the parameter included in the setting command, with one of a plurality of setting records in the setting information that includes the setting item included in the setting command.

Figure 11:
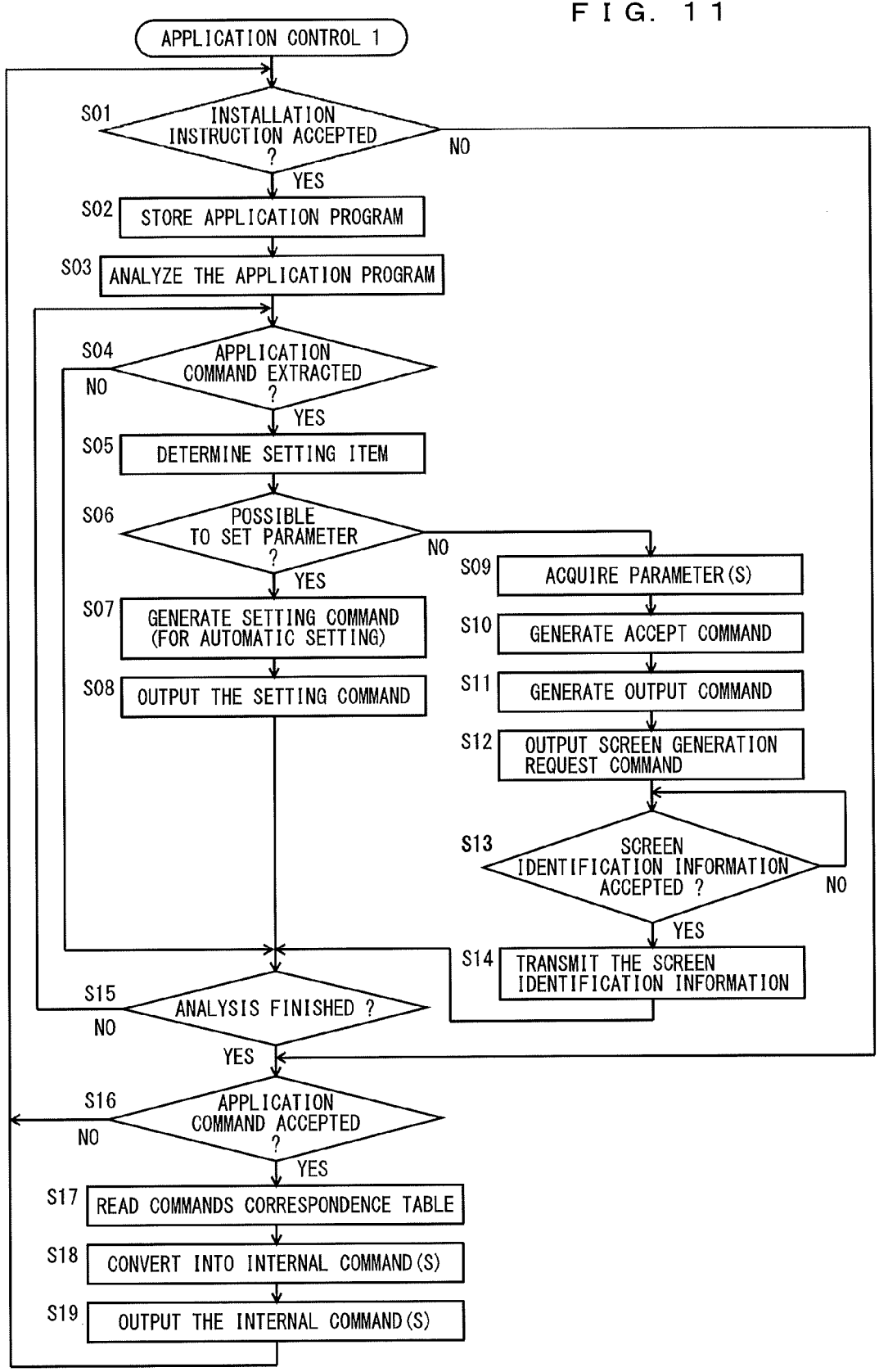
FIG. 11 is a flowchart illustrating an example of the flow of an application control process according to the first embodiment.

FIG. 11 is a flowchart illustrating an example of the flow of an application control process according to the first embodiment of the present invention. The application control process of the first embodiment is carried out by CPU 111 included in MFP 100 of the first embodiment as CPU 111 executes the application control program stored in ROM 113, HDD 115, or CD-ROM 118. Referring to FIG. 11, CPU 111 determines whether an installation instruction has been accepted (step S01). If so ("YES" in step S01), the process proceeds to step S02; otherwise ("NO" in step S01), the process proceeds to step S16.

In step S02, CPU 111 stores into HDD 115 an application program which is input from the outside along with the installation instruction. The process then proceeds to step S03. In the case where communication I/F portion 112 receives the installation instruction from PC 200 in step S01, the application program which communication I/F portion 112 receives from PC 200 is stored into HDD 115. In the case where input control portion 167 accepts the installation instruction in step S01, the application program which external storage device 117 reads from CD-ROM 118 is stored into HDD 115. Further, an application program may be downloaded from a server connected to the Internet.

In the following step S03, CPU 111 analyzes the application program to extract an application command described in the application program. CPU 111 then determines whether an application command has been extracted as a result of the analysis (step S04). If an application command has been extracted, the process proceeds to step S05; otherwise, the process proceeds to step S15.

In step S05, CPU 111 determines a setting item that is associated with the application command. Specifically, CPU 111 refers to a conversion table stored in HDD 115 and extracts, from the conversion records included in the conversion table, a conversion record including the application command, and specifies a setting item that is associated with the application command by the extracted conversion record. Further, CPU 111 determines whether a parameter can be set for the determined setting item (step S06). Specifically, if the conversion record extracted in step S05 associates a single parameter with the setting item, CPU 111 determines that it is possible to set a parameter for the setting item. If a parameter can be set for the setting item, the process proceeds to step S07; otherwise, the process proceeds to step S09.

In step S07, CPU 111 generates a setting command for automatic setting, and the process proceeds to step S08. The setting command for automatic setting is a command for setting, for the setting item determined in step S05, the parameter that is associated with the setting item by the conversion record. In step S08, CPU 111 outputs the setting command for automatic setting to the task of executing the MFP control program (i.e. parameter setting portion 85 in MFP control portion 55). The process then proceeds to step S15.

On the other hand, in step S09, CPU 111 acquires one or more parameters which can be set for the setting item determined in step S05. Specifically, CPU 111 acquires the panel screen information that the task of executing the MFP control program (i.e. parameter management portion 81 in MFP control portion 55) uses when displaying the panel setting screen corresponding to the setting item determined in step S05, and, on the basis of the acquired panel screen information, acquires the one or more parameters that can be set for the setting item determined in step S05.

In step S10, CPU 111 generates an accept command. The accept command is a command instructing to accept selection of one parameter from among the one or more parameters acquired in step S09. Further, in step S11, CPU 111 generates an output command. The output command is a command instructing to output a setting command which instructs that the parameter that has been selected by the user as the accept command generated in step S10 was executed, is set for the setting item determined in step S05. The accept command and the output command are commands defined in HTML.

In the following step S12, CPU 111 outputs a screen generation request command to the task of executing the MFP control program. The screen generation request command is a command that includes an accept command and an output command and requests generation of a selection page. The task of executing the MFP control program generates a selection page and outputs screen identification information of the selection page. This process of generating the selection page will be described later in detail. It is here assumed that the screen identification information is a URL which is a network address.

In step S13, CPU 111 is in a standby mode until it accepts the screen identification information from the task of executing the MFP control program ("NO" in step S13), and once CPU 111 accepts the screen identification information ("YES" in step S13), the process proceeds to step S14.

In step S14, CPU 111 transmits the screen identification information, and the process proceeds to step S15. In the case where an installation instruction is received by communication I/F portion 112, CPU 111 transmits the screen identification information, via communication I/F portion 112, to the device that issued the installation instruction. In the case where an installation instruction is input from operation panel 160, CPU 111 starts a browsing program, and passes the screen identification information, as an argument, to the task of executing the browsing program. This causes a selection page specified by the screen identification information to be displayed on LCD 165 by the task of executing the browsing program.

In step S15, CPU 111 determines whether the analysis of the application program started in step S03 has been finished. If so, the process proceeds to step S16; otherwise, the process returns to step S04.

In step S16, CPU 111 determines whether an application command has been accepted. When an application command is input from the task of executing the application program (i.e. application executing portion 51), CPU 111 accepts the application command. If the application command has been accepted, the process proceeds to step S17; otherwise, the process returns to step S01.

In step S17, CPU 111 reads a commands correspondence table stored in HDD 115. The commands correspondence table associates one application command with one or more internal commands. CPU 111 refers to the commands correspondence table to convert the application command, accepted in step S16, into one or more internal commands (step S18). In the following step S19, CPU 111 outputs the internal command(s) to the task of executing the MFP control program (i.e. internal control portion 87 in MFP control portion 55). The process then returns to step S01.

Figure 12:
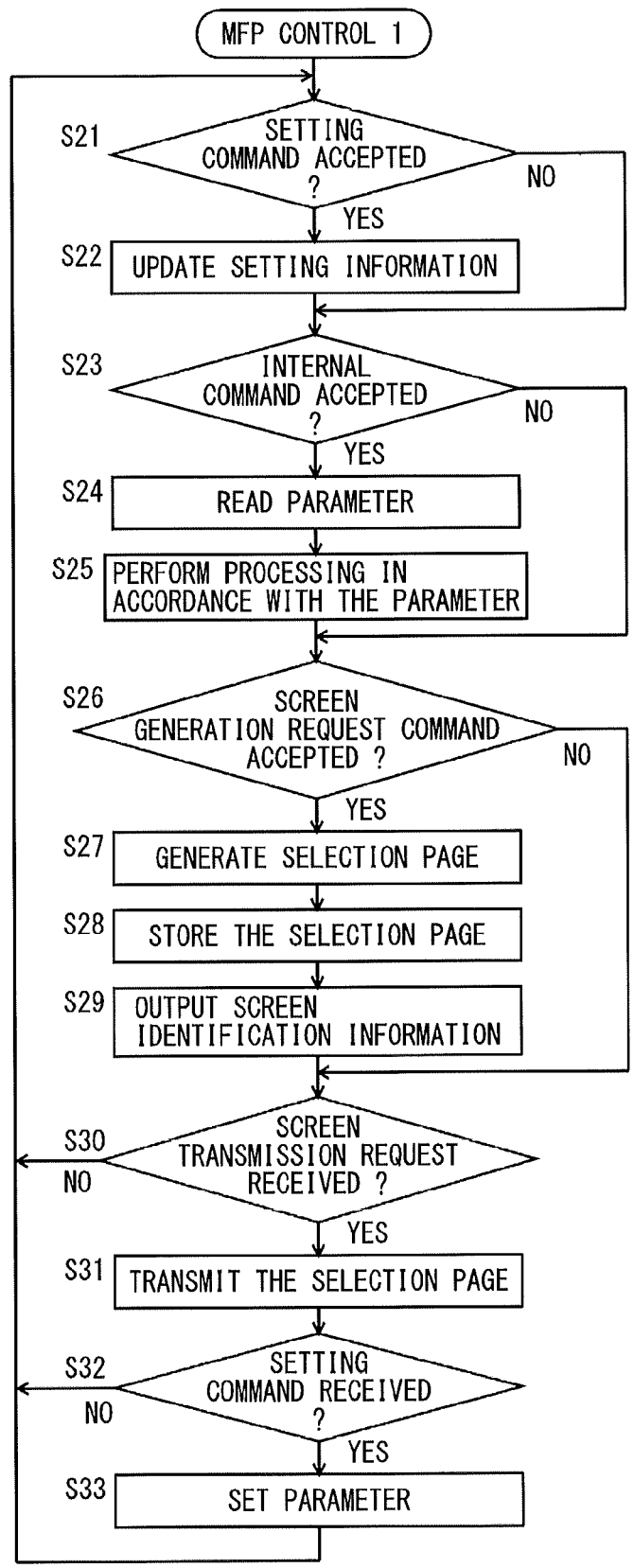
FIG. 12 is a flowchart illustrating an example of the flow of an MFP control process according to the first embodiment.

FIG. 12 is a flowchart illustrating an example of the flow of an MFP control process according to the first embodiment of the present invention. The MFP control process is carried out by CPU 111 as CPU 111 executes the MFP control program stored in ROM 113, HDD 115, or CD-ROM 118. Referring to FIG. 12, CPU 111 (more specifically, the task of executing the MFP control program) determines whether a setting command has been accepted (step S21). The setting command may be input from the task of executing the application control program, or may be received by communication I/F portion 112 (and by server portion 83). The case where communication I/F portion 112 receives a setting command corresponds to the case where the selection page is displayed in one of PCs 200, 200A, and 200B, the output command included in the selection page is executed, and the setting command is transmitted to MFP 100. If a setting command has been accepted, the process proceeds to step S22; otherwise, the process proceeds to step S23.

In step S22, CPU 111 updates the setting information stored in HDD 115, and the process proceeds to step S23. For updating the setting information, the parameter determined by the setting command is set to the setting item determined by the setting command. More specifically, CPU 111 extracts, from among a plurality of setting records included in the setting information stored in HDD 115, a setting record that includes the setting item identical to the one included in the setting command, and updates the parameter associated with the setting item by the extracted setting record, with the parameter included in the setting command.

In step S23, CPU 111 determines whether an internal command has been accepted. If so, the process proceeds to step S24; otherwise, the process proceeds to step S26. The internal command is input from the task of executing the application control program (i.e. conversion portion 61 or screen information transmitting portion 69 in application control portion 53).

In step S24, CPU 111 reads a parameter. Specifically, CPU 111 refers to the setting information stored in HDD 115, and reads the parameter that has been set for the setting item corresponding to the internal command accepted in step S23. More specifically, CPU 111 extracts, from among a plurality of setting records included in the setting information stored in HDD 115, a setting record that includes the setting item identical to the one corresponding to the internal command, and acquires the parameter that has been associated with the setting item by the extracted setting record.

In the following step S25, CPU 111 performs processing determined by the internal command, in accordance with the parameter that has been read, and then the process proceeds to step S26.

In step S26, CPU 111 determines whether a screen generation request command has been accepted from the task of executing the application control program (i.e. setting acceptance control portion 79 in application control portion 53). If so, the process proceeds to step S27; otherwise, the process proceeds to step S30. In step S27, CPU 111 generates a selection page in accordance with the screen generation request command. CPU 111 generates a selection page including the accept command and the output command included in the screen generation request command, and stores the generated selection page into HDD 115 (step S28). In the following step S29, CPU 111 outputs screen identification information of the selection page to the task of executing the application control program (i.e. screen information transmitting portion 69 in application control portion 53). The screen identification information is a network address (URL) assigned to the selection page.

In step S30, CPU 111 determines whether a screen transmission request has been received. The screen transmission request is a GET command or a POST command in hypertext transfer protocol (HTTP). If communication I/F portion 112 receives a screen transmission request from one of PCs 200, 200A, and 200B, the process proceeds to step S31; otherwise, the process returns to step S21. In step S31, CPU 111 transmits the selection page, which was stored in HDD 115 in step S29, via communication I/F portion 112, to the device (one of PCs 200, 200A, and 200B) that issued the screen transmission request.

In the following step S32, CPU 111 determines whether a setting command has been received. For example in the case where CPU 111 transmitted the selection page to PC 200 in step S31, the selection page is displayed in PC 200, the accept command and the output command are executed therein, and a setting command is transmitted from PC 200 to MFP 100. Therefore, the setting command transmitted from PC 200 is received by communication I/F portion 112. If a setting command has been received, the process proceeds to step S33; otherwise, the process returns to step S21.

In step S33, CPU 111 updates the setting information being stored in HDD 115, and the process returns to step S21. Specifically, for the setting item determined by the setting command received in step S32, the parameter determined by the setting command is set, whereby the setting information is updated. More specifically, CPU 111 extracts, from among a plurality of setting records included in the setting information stored in HDD 115, a setting record that includes the setting item identical to the one included in the setting command, and updates the parameter associated with the setting item by the extracted setting record, with the parameter included in the setting command.

As described above, in image forming system 1 according to the first embodiment of the present invention, at the stage when an application program is installed, MFP 100 extracts an application command from the application program, and updates the setting information so as to be able to execute an internal command corresponding to the application command. Accordingly, it is possible to set the setting information such that an application command included in an application program can be executed.

Further, setting information updating portion 67 refers to a conversion table, stored in HDD 115, to determine a setting item to be updated from among a plurality of setting items. It is readily possible to determine a setting item to be updated, for each of a plurality of application commands.

In the case where the conversion table associates a single parameter with a setting item to be updated, automatic setting portion 73 outputs a setting command to parameter setting portion 85. This allows an appropriate parameter to be set for the setting item, without the need of any user operation.

On the other hand, in the case where the setting item to be updated is not associated with a signal parameter in the conversion table, one or more parameters which can be set for the setting item to be updated are acquired on the basis of the setting information managed by parameter management portion 81, and a selection page is generated. In the case where a user operates MFP 100 to input an installation instruction, this selection page is displayed on operation panel 160, allowing the user to select one parameter in operation panel 160. In the case where a user operates one of PCs 200, 200A, and 200B to input an installation instruction, the selection page is displayed on the one of PCs 200, 200A, and 200B operated by the user, allowing the user to select one parameter in that device. Furthermore, the selection page selectably displays the one or more parameters that can be set for the setting item to be updated. This can avoid setting of a parameter that cannot be set.

<Second Embodiment>

In image forming system 1 according to the first embodiment of the present invention, it has been configured such that, at the time of installation of an application program into MFP 100, MFP 100 determines a setting item that needs to be updated. In an image forming system 1A according to the second embodiment of the present invention, PC 200, 200A, or 200B is caused to perform part of the processing performed by MFP 100 in the first embodiment. In the following, the points in which image forming system 1A of the second embodiment differs from image forming system 1 of the first embodiment will be described primarily. The operations of PCs 200, 200A, and 200B are the same, and thus, for the purpose of illustration, it is here assumed that a user uses PC 200 to install an application program into MFP 100.

The overall configuration of the system according to the second embodiment is identical to the example shown in FIG. 1. Further, the hardware configurations of MFP 100 and PCs 200, 200A, and 200B according to the second embodiment are identical respectively to those of MFP 100 and PCs 200, 200A, and 200B according to the first embodiment shown in FIGS. 2 to 5. Thus, a description thereof will not be repeated here.

Figure 13:
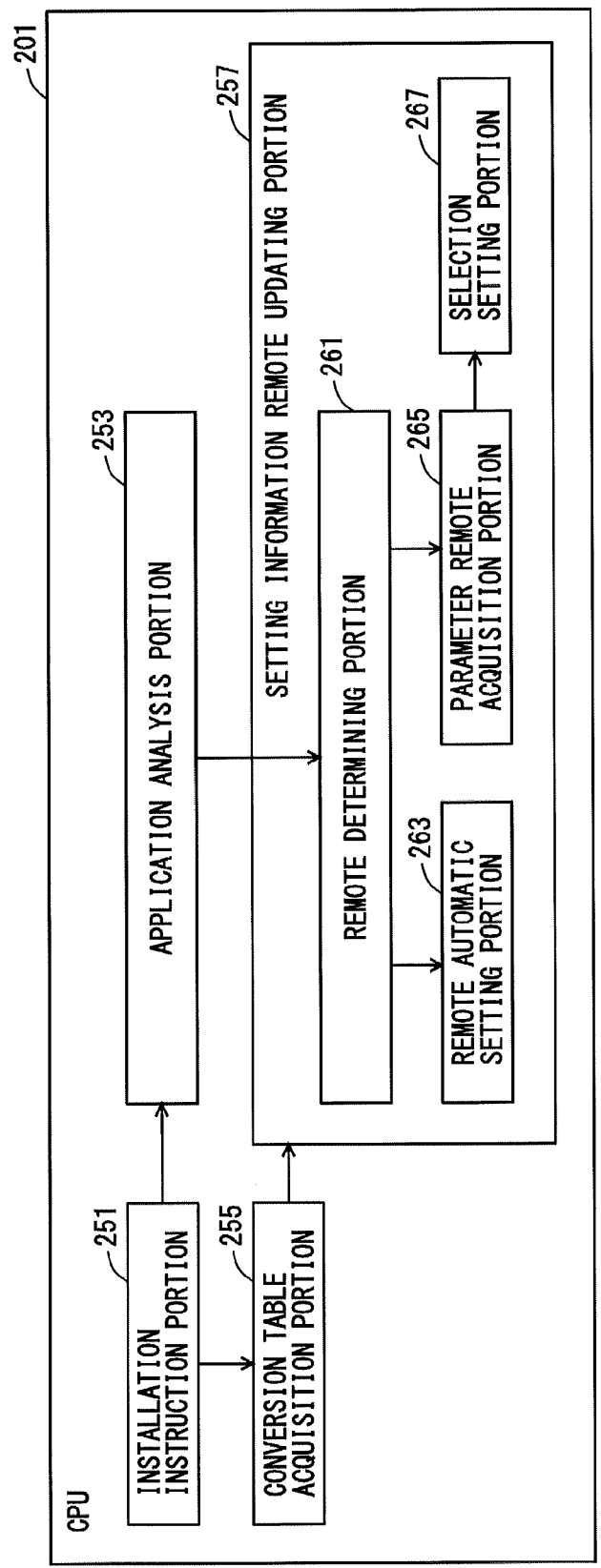
FIG. 13 is a block diagram showing, by way of example, the functions of the CPU included in the PC according to a second embodiment of the present invention.

FIG. 13 is a block diagram showing, by way of example, the functions of the CPU included in the PC according to the second embodiment of the present invention. The functions of CPU 201 included in PC 200 shown in FIG. 13 are formed in CPU 201 as CPU 201 executes a remote installation program stored in ROM 202, HDD 205, or CD-ROM 209A. Referring to FIG. 13, CPU 201 includes an installation instruction portion 251, an application analysis portion 253, a conversion table acquisition portion 255, and a setting information remote updating portion 257.

Installation instruction portion 251 accepts an installation operation which is input by a user who operates PC 200, and transmits an installation instruction to MFP 100. The installation operation includes an operation of designating an application program and an operation of designating a device into which the application program is to be installed. Here, the device into which the application program is to be installed is MFP 100.

When installation instruction portion 251 accepts the installation operation that a user inputs into operation portion 207, installation instruction portion 251 transmits the installation instruction to MFP 100 via network I/F 204. The installation instruction includes the application program designated by the user, and a command instructing to install the application program. Further, installation instruction portion 251 outputs the application program to application analysis portion 253, and also outputs device identification information for identifying the device into which the application program is to be installed, which is MFP 100 in this example, to conversion table acquisition portion 255. Here, the device identification information is an internet protocol (IP) address, which is a network address assigned to MFP 100.

Conversion table acquisition portion 255 receives the device identification information of MFP 100 from installation instruction portion 251, and transmits a conversion table acquisition request, via network I/F 204, to MFP 100 specified by the device identification information. MFP 100 which has received the conversion table acquisition request returns a conversion table to PC 200. The operation of MFP 100 at this time will be described in detail later. The conversion table includes conversion records corresponding respectively to a plurality of application commands. In each conversion record, an application command is associated with a setting item for which a parameter needs to be set so as to allow MFP 100 to execute an internal command corresponding to the application command. Conversion table acquisition portion 255 outputs the conversion table received from MFP 100, to setting information remote updating portion 257.

Application analysis portion 253 analyzes the application program input from installation instruction portion 251, to extract an application command described in the application program. Application analysis portion 253 outputs the extracted application command to setting information remote updating portion 257.

Setting information remote updating portion 257 includes a remote determining portion 261, a remote automatic setting portion 263, a parameter remote acquisition portion 265, and a selection setting portion 267. When remote determining portion 261 receives an application command from application analysis portion 253, remote determining portion 261 refers to the conversion table input from conversion table acquisition portion 255, to extract from the conversion table a conversion record that includes a setting item corresponding to the application command. In the case where the extracted conversion record associates a single parameter with the setting item, remote determining portion 261 outputs the conversion record to remote automatic setting portion 263. On the other hand, in the case where the extracted conversion record does not associate a single parameter with the setting item, remote determining portion 261 outputs the conversion record to parameter remote acquisition portion 265.

When remote automatic setting portion 263 receives a conversion record from remote determining portion 261, remote automatic setting portion 263 generates a setting command for setting, for the setting item included in the conversion record, the parameter which is associated with the setting item by the conversion record, and outputs the setting command to MFP 100 via network I/F 204.

When parameter remote acquisition portion 265 receives a conversion record from remote determining portion 261, parameter remote acquisition portion 265 outputs a parameter transmission request to MFP 100 via network I/F 204. The parameter transmission request includes the setting item included in the conversion record received from remote determining portion 261. MFP 100 which has received the parameter transmission request returns one or more parameters which can be set for the setting item included in the parameter transmission request, to PC 200. The operation of MFP 100 at this time will be described in detail later. MFP 100 stores a forbidden condition which defines a set of parameters that cannot be set for two or more setting items simultaneously. Therefore, parameter remote acquisition portion 265 can acquire only the parameter(s) that can be set for the setting item. When network I/F 204 receives one or more parameters from PC 200, parameter remote acquisition portion 265 outputs a set of the setting item and the one or more parameters received, to selection setting portion 267.

When selection setting portion 267 receives a set of a setting item and one or more parameters from parameter remote acquisition portion 265, selection setting portion 267 generates a remote selection screen, and displays the screen on display portion 206. The remote selection screen selectably displays one or more parameters. When a user inputs to operation portion 207 an operation of selecting one of the one or more parameters in accordance with the remote selection screen, selection setting portion 267 specifies the parameter selected by the user. When one parameter is specified from among the parameter(s) by the user, selection setting portion 267 generates a setting command for setting the specified parameter for the setting item included in the conversion record, and transmits the setting command to MFP 100 via network I/F 204.

Figure 14:
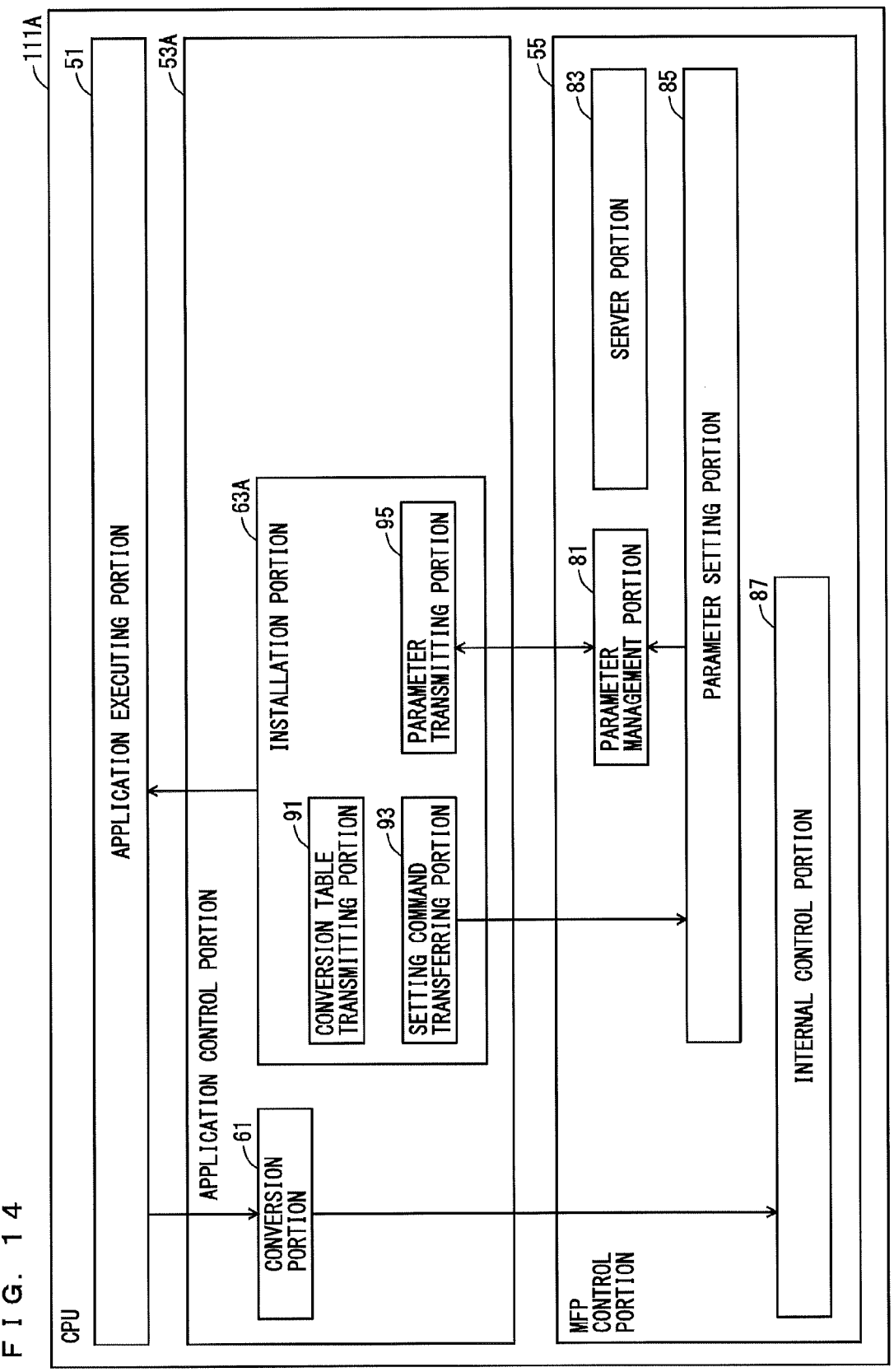
FIG. 14 is a block diagram showing, by way of example, the functions of the CPU included in the MFP according to the second embodiment.

FIG. 14 is a block diagram showing, by way of example, the functions of the CPU included in the MFP according to the second embodiment of the present invention. Referring to FIG. 14, the functions of a CPU 111A included in MFP 100 according to the second embodiment differ from the functions of CPU 111 included in MFP 100 according to the first embodiment shown in FIG. 6 in that application control portion 53 has been changed to an application control portion 53A.

Application control portion 53A includes a conversion portion 61 and an installation portion 63A. Conversion portion 61 is identical to conversion portion 61 included in application control portion 53 according to the first embodiment, and thus, a description thereof will not be repeated here.

Installation portion 63A includes a conversion table transmitting portion 91, a setting command transferring portion 93, and a parameter transmitting portion 95. Conversion table transmitting portion 91 transmits a conversion table stored in HDD 115 in response to a request from one of PCs 200, 200A, and 200B. Specifically, when communication I/F portion 112 receives a conversion table transmission request from, for example, PC 200, conversion table transmitting portion 91 returns the conversion table stored in HDD 115, to PC 200 via communication I/F portion 112.

When communication I/F portion 112 receives a parameter transmission request from one of PCs 200, 200A, and 200B, parameter transmitting portion 95 returns a set of the setting item included in the parameter transmission request and one or more parameters which can be set for the setting item.

It is here assumed that a parameter transmission request is received from PC 200. When communication I/F portion 112 receives a parameter transmission request from PC 200, parameter transmitting portion 95 acquires one or more parameters, as in parameter acquisition portion 75 according to the first embodiment. Specifically, parameter transmitting portion 95 acquires panel screen information that parameter management portion 81 uses when displaying a panel setting screen, and acquires one or more parameters which can be set for the setting item included in the parameter transmission request, on the basis of the panel screen information acquired. Parameter transmitting portion 95 outputs a set of the setting item included in the parameter transmission request and the one or more parameters which can be set for the setting item, to PC 200 via communication I/F portion 112. In MFP 100 according to the second embodiment, setting information stored in HDD 115 includes a forbidden condition, as in MFP 100 according to the first embodiment. The panel screen information generated by parameter management portion 81 includes the parameter(s) which can be set for the setting item, excluding any parameters the setting of which is prohibited in accordance with the forbidden condition. This enables parameter transmitting portion 95 to transmit only the parameter(s) that can be set for the setting item, to PC 200.

When communication I/F portion 112 receives a setting command from PC 200, setting command transferring portion 93 outputs the setting command to parameter setting portion 85 in MFP control portion 55.

Figure 15:
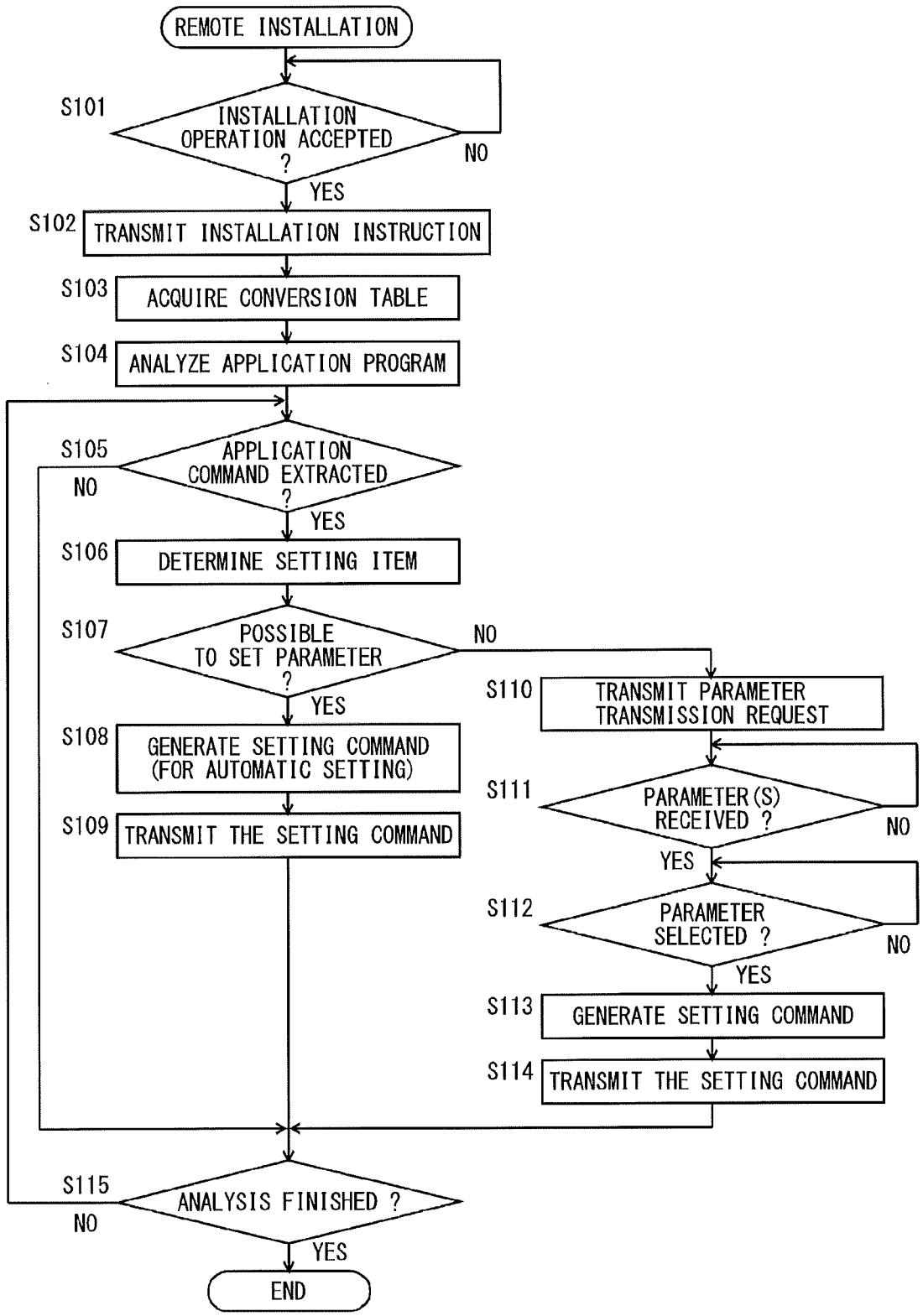
FIG. 15 is a flowchart illustrating an example of the flow of a remote installation process.

FIG. 15 is a flowchart illustrating an example of the flow of a remote installation process. The remote installation process is carried out by CPU 201 included in PC 200 as CPU 201 executes a remote installation program stored in ROM 202, HDD 205, or CD-ROM 209A. Referring to FIG. 15, CPU 201 determines whether an installation operation has been accepted (step S101). The installation operation is an operation input to operation portion 207 by a user who operates PC 200, and includes an operation of designating an application program and an operation of designating a device into which the application program is to be installed. It is here assumed that MFP 100 is designated as the device for installing the application program therein. CPU 201 is in a standby mode until an installation operation is accepted ("NO" in step S101), and once the installation operation is accepted ("YES" in step S101), the process proceeds to step S102.

In step S102, CPU 201 transmits an installation instruction. The installation instruction includes a command instructing installation and the application program designated by the installation operation accepted in step S101. The destination is the device designated by the installation operation, which is MFP 100 in this example. CPU 201 reads the designated application program from HDD 205 or CD-ROM 209A, and transmits the program to MFP 100 via network I/F 204.

In the following step S103, CPU 201 acquires a conversion table. Specifically, CPU 201 transmits a conversion table acquisition request to MFP 100 designated by the installation operation, via network I/F 204. When network I/F 204 receives a conversion table from MFP 100, CPU 201 acquires the received conversion table, and temporarily stores the table in RAM 203. The conversion table includes conversion records corresponding respectively to a plurality of application commands. In each conversion record, an application command is associated with a setting item for which a parameter needs to be set so as to allow MFP 100 to execute an internal command corresponding to the application command.

In the following step S104, CPU 201 analyzes the application program designated in step S101, to extract an application command described in the application program. Further, CPU 201 determines whether an application command has been extracted as a result of the analysis (step S105). If so, the process proceeds to step S106; otherwise, the process proceeds to step S115.

In step S106, CPU 201 determines a setting item associated with the application command. Specifically, CPU 201 refers to the conversion table which has been acquired in step S103 and temporarily stored in RAM 203, to extract one of the conversion records included in the conversion table that includes the application command. CPU 201 then specifies the setting item that is associated with the application command by the extracted conversion record.

CPU 201 determines whether a parameter can be set for the determined setting item (step S107). Specifically, if a single parameter has been associated with the setting item by the conversion record extracted in step S106, CPU 201 determines that it is possible to set a parameter for the setting item. If a parameter can be set for the setting item, the process proceeds to step S108; otherwise, the process proceeds to step S110.

In step S108, CPU 201 generates a setting command for automatic setting, and the process proceeds to step S109. The setting command for automatic setting is a command for setting, for the setting item determined in step S106, the parameter that is associated with the setting item by the conversion record. In step S109, CPU 201 transmits the setting command for automatic setting, and then the process proceeds to step S115. Specifically, CPU 201 transmits the setting command to MFP 100 which has been designated by the installation operation, via network I/F 204.

On the other hand, in step S110, CPU 201 transmits a parameter transmission request to MFP 100 which has been designated by the installation operation, via network I/F 204. The parameter transmission request includes the setting item determined in step S106. In the following step S111, CPU 201 is in a standby mode until network I/F 204 receives one or more parameters which are returned from MFP 100, and once network I/F 204 receives the parameter(s) returned from MFP 100, the process proceeds to step S112. Further, CPU 201 accepts a user operation of selecting a parameter from among the received parameter(s). Specifically, CPU 201 displays on display portion 206 a remote selection screen which selectably displays one or more parameters, and determines whether a user operation of selecting one of the one or more parameters, input to operation portion 207 in accordance with the remote selection screen, has been accepted (step S112). CPU 201 is in a standby mode until an operation of selecting one of the parameter(s) has been accepted, and once such an operation is accepted, the process proceeds to step S113.

In step S113, CPU 201 generates a setting command, and the process proceeds to step S114. The setting command is a command instructing to set the parameter selected in step S112, for the setting item determined in step S106. In step S114, CPU 201 transmits the generated setting command, and the process proceeds to step S115. Specifically, CPU 201 transmits the setting command to MFP 100 which has been designated by the installation operation, via network I/F 204.

In step S115, CPU 201 determines whether the analysis of the application program started in step S104 has been finished. If so, the process is terminated; otherwise, the process returns to step S105.

Figure 16:
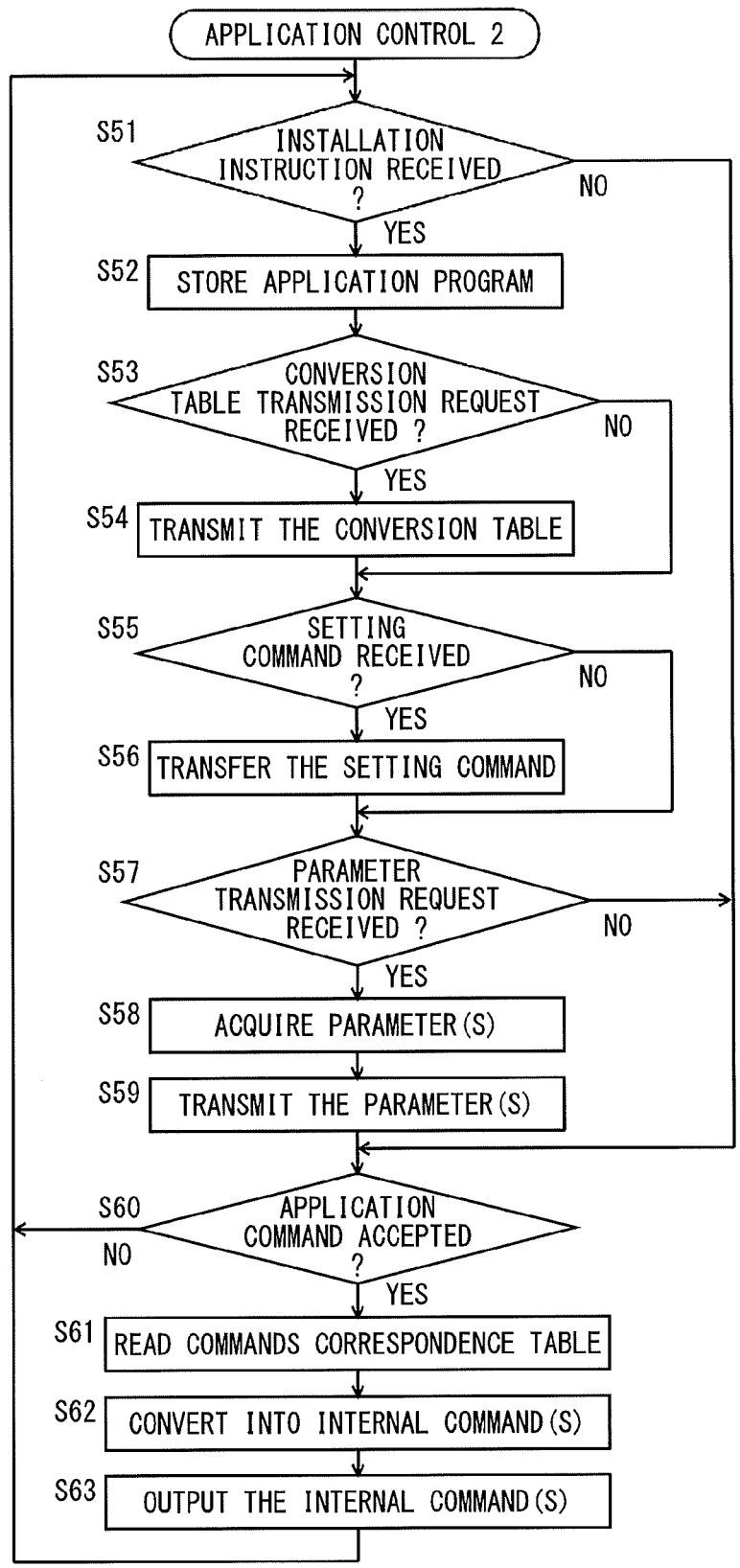
FIG. 16 is a flowchart illustrating an example of the flow of the application control process according to the second embodiment.

FIG. 16 is a flowchart illustrating an example of the flow of the application control process according to the second embodiment. The application control process of the second embodiment is carried out by CPU 111A included in MFP 100 of the second embodiment as CPU 111A executes the application control program stored in ROM 113, HDD 115, or CD-ROM 118.

Referring to FIG. 16, CPU 111A determines whether an installation instruction has been received (step S51). CPU 111A determines whether communication I/F portion 112 has received an installation instruction from any of PCs 200, 200A, and 200B. If an installation instruction has been received ("YES" in step S51), the process proceeds to step S52; otherwise ("NO" in step S51), the process proceeds to step S60. It is here assumed that an installation instruction is received from PC 200. In step S52, CPU 111A stores into HDD 115 an application program which is received from PC 200 along with the installation instruction. The process then proceeds to step S53.

In step S53, CPU 111A determines whether a conversion table transmission request has been received. CPU 111A determines whether communication I/F portion 112 has received a conversion table transmission request from PC 200 that issued the installation instruction. If a conversion table transmission request has been received ("YES" in step S53), the process proceeds to step S54; otherwise ("NO" in step S53), the process proceeds to step S55. In step S54, CPU 111A transmits a conversion table stored in HDD 115, to PC 200 that issued the conversion table transmission request, via communication I/F portion 112. The process then proceeds to step S55.

In step S55, CPU 111A determines whether a setting command has been received. CPU 111A determines whether communication I/F portion 112 has received a setting command from PC 200 that issued the installation instruction. If a setting command has been received ("YES" in step S55), the process proceeds to step S56; otherwise ("NO" in step S55), the process proceeds to step S57. In step S56, CPU 111A transfers the received setting command to the task of executing the MFP control program (i.e. parameter setting portion 85 in MFP control portion 55), and then the process proceeds to step S57.

In step S57, CPU 111A determines whether a parameter transmission request has been received. CPU 111A determines whether communication I/F portion 112 has received a parameter transmission request from PC 200 that issued the installation instruction. If a parameter transmission request has been received ("YES" in step S57), the process proceeds to step S58; otherwise ("NO" in step S57), the process proceeds to step S60. The parameter transmission request includes a setting item.

In step S58, CPU 111A acquires one or more parameters which can be set for the setting item included in the parameter transmission request received in step S57. Specifically, CPU 111A outputs a parameter acquisition request to the task of executing the MFP control program (i.e. parameter management portion 81 in MFP control portion 55), and accepts one or more parameters that the task of executing the MFP control program outputs. The parameter acquisition request includes the setting item that is included in the parameter transmission request received in step S57. In step S59, CPU 111A transmits the one or more parameters acquired in step S58, to PC 200 that issued the parameter transmission request. The process then proceeds to step S60.

Steps S60 to S63 are identical to steps S16 to S19 in the application control process according to the first embodiment shown in FIG. 11, and thus, a description thereof will not be repeated here.

Figure 17:
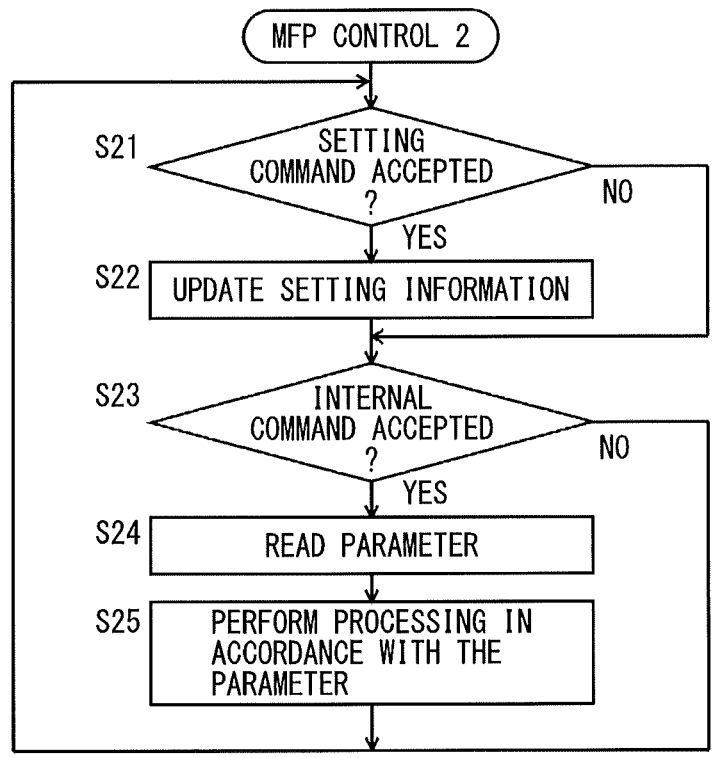
FIG. 17 is a flowchart illustrating an example of the flow of the MFP control process according to the second embodiment.

FIG. 17 is a flowchart illustrating an example of the flow of the MFP control process according to the second embodiment. The MFP control process of the second embodiment is carried out by CPU 111A included in MFP 100 of the second embodiment as CPU 111A executes the MFP control program stored in ROM 113, HDD 115, or CD-ROM 118. Referring to FIG. 17, the MFP control process according to the second embodiment differs from the MFP control process according to the first embodiment shown in FIG. 12 in that steps S26 to S33 have been deleted. The other steps are identical to those shown in FIG. 12, and thus, a description thereof will not be repeated here.

In image forming system 1A according to the second embodiment of the present invention, at the stage when PC 200 installs an application program into MFP 100, PC 200 acquires a conversion table from MFP 100, extracts an application command from the application program, and determines a setting item to be updated. Then, PC 200 updates the setting information in MFP 100 so as to bring MFP 100 into the state where it can execute an internal command corresponding to the application command. Accordingly, it is possible to set MFP 100 to the state where MFP 100 is capable of executing the application program.

Further, setting information remote updating portion 257 in PC 200 refers to the conversion table acquired from MFP 100, to determine any setting item that should be updated, from among a plurality of setting items. Accordingly, it is readily possible to determine a setting item to be updated in MFP 100, for each of a plurality of application commands.

In the case where the conversion table associates a single parameter with the setting item to be updated, remote automatic setting portion 263 in PC 200 transmits a setting command to MFP 100. This makes it possible to set MFP 100, without the need of any user operation.

In the case where the conversion table does not associate a single parameter with the setting item to be updated, PC 200 acquires, from MFP 100, one or more parameters which can be set for the setting item to be updated. This can avoid setting of any parameter(s) that cannot be set in MFP 100, for example the parameter(s) the setting of which is prohibited in accordance with the forbidden condition.

While MFP 100 has been described as an example of the image forming apparatus in the above embodiment, the present invention may of course be understood as an application installation method for causing MFP 100 to perform the processing shown in FIGS. 11 and 12, or as an application installation program for causing CPU 111 to perform the application installation method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
a processor configured to:
refer to setting information having parameters set respectively for a plurality of setting items in response to input of an internal command, and perform processing predetermined for said input internal command in accordance with the parameter set for the setting item corresponding to said input internal command;
execute an application program;
convert an application command into said internal command in the case where said processor executes said application program and outputs said application command which has been released for controlling the processing performed by the processor, and output the obtained internal command to perform the processing predetermined for the obtained internal command;
analyze said application program at the stage of installation of said application program and extract said application command, and update said setting information to a state where the processor is capable of executing said internal command corresponding to said extracted application command.

2. The image forming apparatus according to claim 1, wherein said processor is further configured to:
determine a setting item to be updated from among said plurality of setting items by referring to a conversion table, the conversion table associating each of said plurality of application commands with a setting item for which a parameter needs to be set in order for the processor to execute the internal command corresponding to the application command.

3. The image forming apparatus according to claim 2, wherein the processor is further configured to:
set a parameter, in response to input of a setting command, for the setting item specified by said setting command, and
set said parameter for said determined setting item in the case where said conversion table associates a parameter with said determined setting item.

4. The image forming apparatus according to claim 3, wherein the processor is further configured to:
manage said setting information;
acquire one or more parameters, in the case where said conversion table does not associate a parameter with said determined setting item, that can be set for said determined setting item on the basis of the setting information managed by the processor; and
set, for said determined setting item, a parameter selected from among said acquired one or more parameters.

5. The image forming apparatus according to claim 4, wherein the processor is further configured to:
output a page described in a markup language;
generate an accept command and an output command, the accept command instructing acceptance of selection of one of said acquired one or more parameters, the output command instructing output of a setting command instructing to set said selected parameter for said determined setting item;
output said generated accept command and output command to cause the processor to generate a selection page being described in a markup language and including said accept command and output command; and
output said setting command, in the case where the output command included in said generated selection page is executed by a device that displays said selection page and said setting command is input from the device, to set the parameter.

6. The image forming apparatus according to claim 5, wherein the processor is further configured to:
accept an installation instruction to install an application program from an information processing apparatus connected via a network, and install said application program in accordance with said installation instruction;
transmit page identification information for identifying said selection page generated by the processor to the information processing apparatus that issued said installation instruction;
transmit said selection page, in response to reception of a transmission request including said page identification information from the information processing apparatus that issued said installation instruction, to said information processing apparatus; and
output said received setting command, in response to reception of said setting command from said information processing apparatus that received said selection page, to set the parameter.

7. An image forming system including an image forming apparatus and an information processing apparatus capable of communicating with said image forming apparatus, said image forming apparatus comprising a first processor configured to:
refer to setting information having parameters set respectively for a plurality of setting items in response to input of an internal command, and perform processing predetermined for said input internal command in accordance with the parameter set for the setting item corresponding to said input internal command;
set a parameter, in response to input of a setting command, for the setting item specified by said setting command;
execute an application program;
convert an application command into said internal command, in the case where the first processor executes said application program and outputs said application command which has been released for controlling the processing performed by the processor, and output the obtained internal command to perform the processing predetermined for the obtained internal command; and
transmit a conversion table in response to a request from said information processing apparatus, the conversion table associating each of said plurality of application commands with a setting item for which a parameter needs to be set in order for the first processor to execute the internal command corresponding to the application command;

said information processing apparatus comprising a second processor configured to:
acquire said conversion table from said image forming apparatus;
transmit, to said image forming apparatus, an instruction to install an application program into said image forming apparatus
analyze said application program and extract said application command; and
transmit, to said image forming apparatus, a setting command instructing to set a parameter for said setting item associated with said extracted application command by said conversion table;

said first processor in said image forming apparatus further configured to:
install an application program in accordance with an installation instruction received from said information processing apparatus, and
output said setting command, in response to reception of said setting command from said information processing apparatus, to set the parameter.

8. The image forming system according to claim 7, wherein the second processor is further configured to: transmit a setting command, in the case where said conversion table associates a parameter with said determined setting item, instructing to set said parameter for said determined setting item, to said image forming apparatus.

9. The image forming system according to claim 7, wherein
said first processor is further configured to manage said setting information, and
said second processor is further configured to:
acquire one or more parameters, in the case where said conversion table does not associate a parameter with said determined setting item, that can be set for said determined setting item from said image forming apparatus; and
accept selection of one of said acquired one or more parameters and transmit, to said image forming apparatus, a setting command instructing to set said selected parameter for said determined setting item.

10. An application installation method performed by an image forming apparatus,
said image forming apparatus including
an internal control portion operable, in response to input of an internal command, to refer to setting information having parameters set respectively for a plurality of setting items, and perform processing predetermined for said input internal command in accordance with the parameter set for the setting item corresponding to said input internal command, and
an application executing portion to execute an application program, the method comprising:
an application control step of, in the case where said application executing portion executes said application program and outputs an application command which has been released for controlling said internal control portion, converting said output application command into said internal command and outputting the obtained internal command to said internal control portion;
a step of, at the stage of installation of said application program, analyzing said application program and extracting said application command; and
a setting information updating step of updating said setting information to a state where said internal control portion is capable of executing said internal command corresponding to said extracted application command.

11. The application installation method according to claim 10, wherein said setting information updating step includes a setting item determining step of determining a setting item to be updated from among said plurality of setting items by referring to a conversion table, the conversion table associating each of said plurality of application commands with a setting item for which a parameter needs to be set in order for said internal control portion to execute the internal command corresponding to the application command.

12. The application installation method according to claim 11, wherein
said image forming apparatus further includes a parameter setting portion operable, in response to input of a setting command, to set a parameter for the setting item specified by said setting command, and
said setting information updating step further includes an automatic setting step of, in the case where said conversion table associates a parameter with said determined setting item, outputting a setting command instructing to set said parameter for said determined setting item, to said parameter setting portion.

13. The application installation method according to claim 12, wherein
said image forming apparatus further includes a parameter management portion to manage said setting information, and
said setting information updating step further includes
a parameter acquisition step of, in the case where said conversion table does not associate a parameter with said determined setting item, acquiring one or more parameters that can be set for said determined setting item on the basis of the setting information managed by said parameter management portion, and
a selection setting step of setting, for said determined setting item, a parameter selected from among said acquired one or more parameters.

14. The application installation method according to claim 13, wherein
said image forming apparatus further includes a server portion to output a page described in a markup language,
said selection setting step includes
a command generating step of generating an accept command and an output command, the accept command instructing acceptance of selection of one of said acquired one or more parameters, the output command instructing output of a setting command instructing to set said selected parameter for said determined setting item, and
a step of outputting said generated accept command and output command to said server portion to cause said server portion to generate a selection page being described in a markup language and including said accept command and output command, and
said server portion is operable, in the case where the output command included in said generated selection page is executed by a device that displays said selection page and said setting command is input from the device, to output said setting command to said parameter setting portion.

15. The application installation method according to claim 14, further comprising:
an installation step of, in response to acceptance of an installation instruction to install an application program from an information processing apparatus connected via a network, installing said application program in accordance with said installation instruction; and
a screen information transmitting step of transmitting page identification information for identifying said selection page generated by said server portion to the information processing apparatus that issued said installation instruction, wherein
said server portion is operable
in response to reception of a transmission request including said page identification information from the information processing apparatus that issued said installation instruction, to transmit said selection page to said information processing apparatus, and
in response to reception of said setting command from said information processing apparatus that received said selection page, to output said received setting command to said parameter setting portion.

16. A non-transitory computer-readable recording medium encoded with an application installation program performed by a computer controlling an image forming apparatus,
said image forming apparatus including
an internal control portion operable, in response to input of an internal command, to refer to setting information having parameters set respectively for a plurality of setting items, and perform processing predetermined for said input internal command in accordance with the parameter set for the setting item corresponding to said input internal command, and
an application executing portion to execute an application program,
the program causing said computer to perform:
an application control step of, in the case where said application executing portion executes said application program and outputs an application command which has been released for controlling said internal control portion, converting said output application command into said internal command and outputting the obtained internal command to said internal control portion;
a step of, at the stage of installation of said application program, analyzing said application program and extracting said application command; and
a setting information updating step of updating said setting information to a state where said internal control portion is capable of executing said internal command corresponding to said extracted application command.

17. The non-transitory computer-readable recording medium encoded with the application installation program according to claim 16, wherein said setting information updating step includes a setting item determining step of determining a setting item to be updated from among said plurality of setting items by referring to a conversion table, the conversion table associating each of said plurality of application commands with a setting item for which a parameter needs to be set in order for said internal control portion to execute the internal command corresponding to the application command.

18. The non-transitory computer-readable recording medium encoded with the application installation program according to claim 17, wherein
said image forming apparatus further includes a parameter setting portion operable, in response to input of a setting command, to set a parameter for the setting item specified by said setting command, and
said setting information updating step further includes an automatic setting step of, in the case where said conversion table associates a parameter with said determined setting item, outputting a setting command instructing to set said parameter for said determined setting item, to said parameter setting portion.

19. The non-transitory computer-readable recording medium encoded with the application installation program according to claim 18, wherein
said image forming apparatus further includes a parameter management portion to manage said setting information, and
said setting information updating step further includes
a parameter acquisition step of, in the case where said conversion table does not associate a parameter with said determined setting item, acquiring one or more parameters that can be set for said determined setting item on the basis of the setting information managed by said parameter management portion, and
a selection setting step of setting, for said determined setting item, a parameter selected from among said acquired one or more parameters.

20. The non-transitory computer-readable recording medium encoded with the application installation program according to claim 19, wherein
said image forming apparatus further includes a server portion to output a page described in a markup language,
said selection setting step includes
a command generating step of generating an accept command and an output command, the accept command instructing acceptance of selection of one of said acquired one or more parameters, the output command instructing output of a setting command instructing to set said selected parameter for said determined setting item, and
a step of outputting said generated accept command and output command to said server portion to cause said server portion to generate a selection page being described in a markup language and including said accept command and output command, and
said server portion is operable, in the case where the output command included in said generated selection page is executed by a device that displays said selection page and said setting command is input from the device, to output said setting command to said parameter setting portion.

21. The non-transitory computer-readable recording medium encoded with the application installation program according to claim 20, causing said computer to further perform:

an installation step of, in response to acceptance of an installation instruction to install an application program from an information processing apparatus connected via a network, installing said application program in accordance with said installation instruction; and a screen information transmitting step of transmitting page identification information for identifying said selection page generated by said server portion to the information processing apparatus that issued said installation instruction, wherein said server portion is operable in response to reception of a transmission request including said page identification information from the information processing apparatus that issued said installation instruction, to transmit said selection page to said information processing apparatus, and in response to reception of said setting command from said information processing apparatus that received said selection page, to output said received setting command to said parameter setting portion.

* * * * *